United States Patent [19]

Riskin

[11] Patent Number: 5,031,206
[45] Date of Patent: * Jul. 9, 1991

[54] METHOD AND APPARATUS FOR IDENTIFYING WORDS ENTERED ON DTMF PUSHBUTTONS

[75] Inventor: Bernard N. Riskin, Lambertville, N.J.

[73] Assignee: Fon-Ex, Inc., Lambertville, N.J.

[*] Notice: The portion of the term of this patent subsequent to Sep. 12, 2006 has been disclaimed.

[21] Appl. No.: 225,266

[22] Filed: Jul. 28, 1988

Related U.S. Application Data

[63] Continuation-in-part of Ser. No. 126,630, Nov. 30, 1987, Pat. No. 4,866,759.

[51] Int. Cl.⁵ .......................................... H04M 11/00
[52] U.S. Cl. .................................................... 379/97
[58] Field of Search ....................... 379/88, 89, 93, 96, 379/97, 98, 113, 354; 382/40

[56] References Cited

U.S. PATENT DOCUMENTS

| | | | |
|---|---|---|---|
| 4,307,266 | 12/1981 | Messina | 379/96 |
| 4,427,848 | 1/1984 | Tsakanikas | 379/97 |
| 4,532,378 | 7/1985 | Nakayama et al. | 379/96 |
| 4,608,457 | 8/1986 | Fowler et al. | 379/96 |
| 4,633,041 | 12/1986 | Boivie et al. | 379/354 |
| 4,649,563 | 3/1987 | Riskin | 379/97 |
| 4,677,659 | 6/1987 | Dargan | 379/97 |
| 4,737,980 | 4/1988 | Curtin et al. | 379/97 |
| 4,757,267 | 7/1988 | Riskin | 379/97 |
| 4,817,129 | 3/1989 | Riskin | 379/97 |
| 4,866,759 | 9/1989 | Riskin | 379/97 |

Primary Examiner—Alvin E. Oberley
Assistant Examiner—Richard Hjerpe
Attorney, Agent, or Firm—Mathews, Woodbridge & Collins

[57] ABSTRACT

The identity of a word entered on DTMF (Dual Tone Multi-Frequency) pushbuttons is determined by identifying letters according to their frequency in groups of 2s and 3s and up to n-letter groups. Initially, a sender will type a word on a DTMF pushbutton pad. Since each button represents three (3) possible letters, or four in the case of 7 (PQRS) and 9 (WXYZ), the system will look up the possible meanings for the word from an internal memory which includes a dictionary. If the word does not exist in the dictionary, then the system will search against a Forward and a Reverse Dictionary to guess at the identity of fragments from the beginning and ending of the word. Then it will guess the identity of each letter according to its relative frequency in groups of 3s known as Trigrams, or in groups of 2s known as Digrams. The Trigams are preferably arranged in five (5) files to identify the first, second, third and final letters of a word as well as any non-specified middle location. The system can be extended to any letter grouping of size n where n is two or more. Once identified, the word is stored as part of a message and then transmitted as ASCII digital information over a packet data network to a remote receiver where digital to voice synthesis converts the message into audio. Other delivery methods include alphanumeric pagers, FAX, E-Mail, telex, computer printed output, telegrams and cables.

29 Claims, 13 Drawing Sheets

FIG. 3A
PROCESS BEGINS HERE AFTER FAILED DICTIONARY 42 SEARCH (DID NOT MAKE AN EXACT MATCH OF INPUT vs ORIGINAL DICTIONARY
FIG. 3
LETTER-AT-A-TIME PROCESS
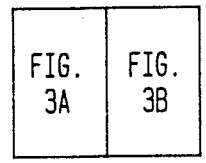
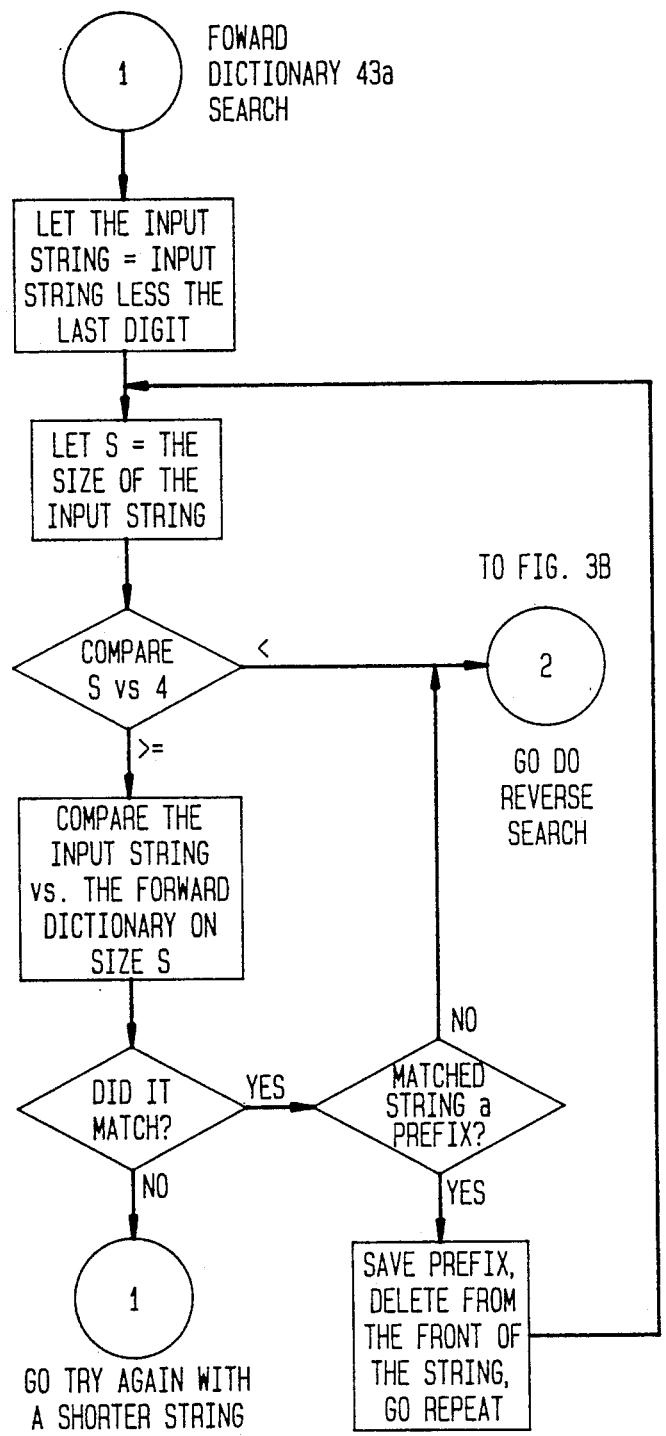

LETTER-AT-A-TIME PROCESS
FORWARD N-GRAM
SEARCH

| FIG. 3C | FIG. 3D |

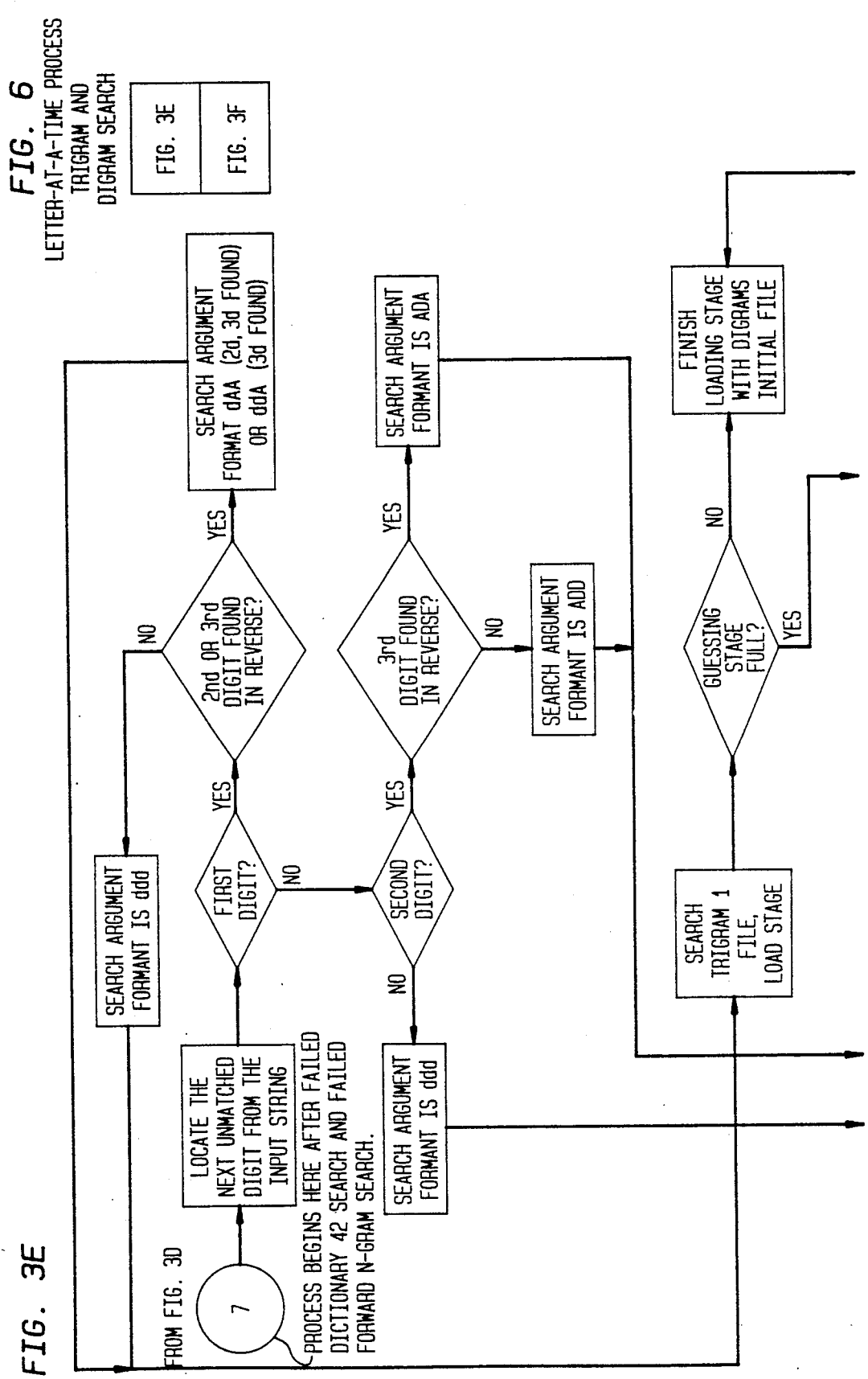

FIG. 4A

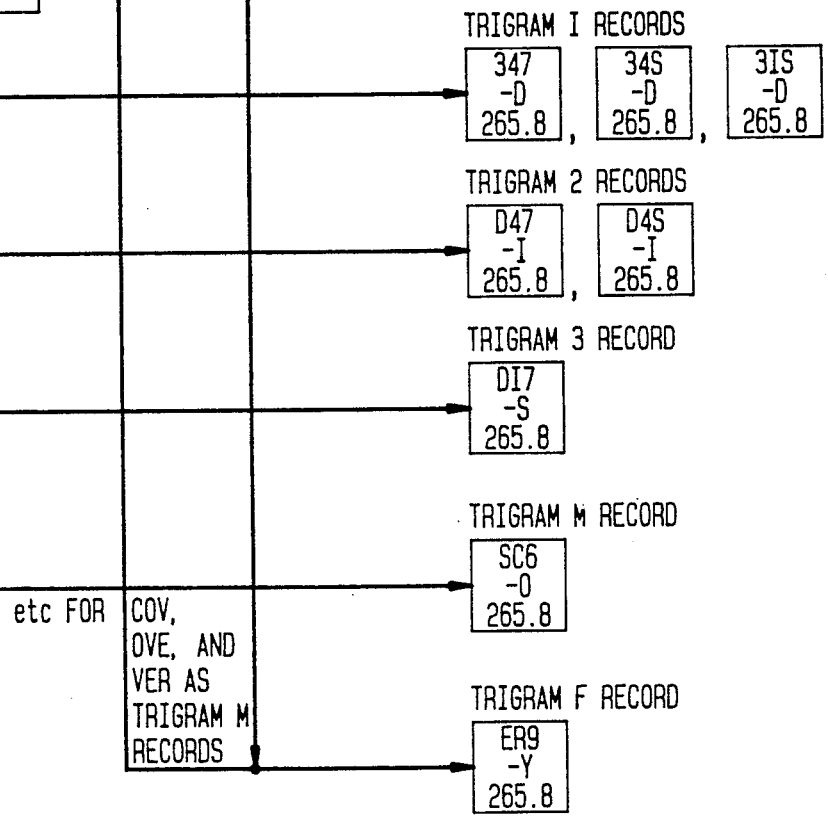

METHOD OF GENERATING TRIGRAM FILES
FROM ORIGINAL DICTIONARY FILE

TYPICAL WORD FROM ORIGINAL DICTIONARY 42 FILE: "DICTIONARY"

D I S C O V E R Y — 265.8   EXPECTED OCCURENCES PER
MILLION WORDS OF TEXT: 265.8

TRIGRAM 1 RECORDS: 347-D 265.8, 34S-D 265.8, 3IS-D 265.8

TRIGRAM 2 RECORDS: D47-I 265.8, D4S-I 265.8

TRIGRAM 3 RECORD: DI7-S 265.8

TRIGRAM M RECORD: SC6-O 265.8 etc FOR COV, OVE, AND VER AS TRIGRAM M RECORDS

TRIGRAM F RECORD: ER9-Y 265.8

ALSO, re THE TRIGRAM 1 RECORDS (e.g.):

DISPARATE - 106.8 ———— 347-D 106.8, 34S-D 106.8, 3IS-D 106.8
DIRECTLY - 47.9 ———— 347-D 47.9, 34R-D 47.9, 3IR-D 47.9
FISSURE - 25.5 ———— 347-F 25.5, 34S-F 25.5, 3IS-F 25.5
EGREGIOUS - 23.2 ———— 347-E 23.2, 34R-E 23.2, 3GR-E 23.2

ALSO, re THE TRIGRAM 2 RECORDS (e.g.):

DISPARATE - 106.8 ———— D47-I 106.8, D4S-I 106.8
DIRECTLY - 47.9 ———— D47-I 47.9, D4R-I 47.9
FISSURE - 25.5 ———— F47-I 25.5, F4S-I 25.5
EGREGIOUS - 23.2 ———— E47-G 23.2, E4R-G 23.2

FIG. 4B
FORMAT AND SEQUENCE OF RECORDS IN THE TRIGRAM FILES

TRIGRAM I
```
347-D498.7   USED TO GUESS THE 3 OF THE 347-
347-F311.6   THE INITIAL DIGIT OF THE STRING.
347-E202.7

34P-D231.4   USED TO GUESS THE 3 OF THE 34A-
34P-E105.6   THE INITIAL DIGIT OF THE STRING
34P-F101.1   WHERE A IS AN ALPHA, P, Q, R, OR S
34Q-F95.8
34Q-E87.9
34Q-D74.9
34R-E161.9
34R-F39.8
34R-F23.9
34S-E281.9
34S-D207.6
34S-F22.1

3GP-E102.8   USED TO GUESS THE 3 OF THE 3AA-
3GP-F43.8    THE INITIAL DIGIT OF THE STRING
             WHERE AA ARE ALPHAS, GP, GQ, GR, GS;
3GP-D23.7    HP, HQ, HR, HS; IP, IQ, IR, IS
(3GQ)        THREE IS NO ENTRY FOR THIS COMBINATION BECAUSE 3GQ DID
             NOT OCCUR ONCE IN THE ORIGINAL DICTIONARY IN THE FIRST
             THREE CHARACTERS OF ANY WORD.
3GR-E46.8
3GR-D43.2
3GR-F23.7
3GS-...
3GS-...
3GS-...
3HP-...
3HP-...
3HP-...
3HQ-...
3HQ-...
3HQ-...
3HR-...
3HR-...
3HR-...
3HS-...
3HS-...
3HS-...
3IP-...   etc. TO 3IS-E, 3IS-D, 3IS-F (e.g.)
```

FIG. 4C

FORMAT AND SEQUENCE OF RECORDS
IN THE TRIGRAM FILES

TRIGRAM 2  D47-I505.6  USED TO GUESS THE 4 OF THE D47-
           D47-H416.1  THE SECOND DIGIT OF THE STRING.
           D47-G311.1

D4P-I321.3  USED TO GUESS THE 4 OF THE D4A-
           D4P-G112.3  THE SECOND DIGIT OF THE STRING,
           D4P-H102.7  WHERE A IS AN ALPHA, P, Q, R, OR S
           D4Q-I67.7
           (D4Q)       (NO ENTRIES FOR D4Q-G, D4Q-H, D4Q-I)
           D4R-I132.5
           D4R-H31.4
           D4R-G12.3
           D4S-I87.7
           D4S-H32.1
           D4S-        (NO ENTRY FOR D4S-G)

TRIGRAM 3  DI7-S416.5  USED TO GUESS THE 7 OF THE DI7-
           DI7-R401.4  THE THIRD DIGIT OF THE STRING.
           DI7-P306.5
           DI7-Q061.6

TRIGRAM M  SC6-O519.1  USED TO GUESS THE 6 OF THE SC6-
           SC6-M401.1  A DIGIT SOMEWHERE IN THE MIDDLE
           SC6-N336.8  OF A STRING.

TRIGRAM F  ER9-Y303.6  USED TO GUESS THE 9 OF THE ER9-
           ER9-W209.7  THE FINAL DIGIT OF THE STRING.
           ER9-Z188.8
           ER9-X103.9

5,031,206

METHOD AND APPARATUS FOR IDENTIFYING WORDS ENTERED ON DTMF PUSHBUTTONS

CROSS REFERENCE TO RELATED APPLICATION

This application is a continuation-in-part of my co-pending application Ser. No. 07/126,630 filed Nov. 30, 1987 now U.S. Pat. No. 4,866,759, entitled "Packet Network Telecommunication System Having Access Nodes With Word Processing Capability". The entire contents of which is hereby incorporated by reference into this application.

BACKGROUND OF THE INVENTION

1. Field of the Invention

The invention relates to a method and apparatus for identifying words from letters entered on a DTMF pushbutton pad.

2. Description of Related Art

The concept of trying to determine the identity of a word based upon the frequency of the letters in the word is generally known in the cryptanalytical art. An interesting discussion concerning the frequency of words in the English language is found on pages 18 and 20 of the March 1988 edition of the Atlantic. For example, it is noted that nine (9) English words comprise fully a quarter of all spoken words and that forty-three (43) words account for half of the words that we use in every day speech. However, insofar as can be determined, none of the prior art appears to teach or suggest a sophisticated word guessing method and apparatus that can be employed in the context of a communications system.

The prior art also discloses some systems for using a DTMF keypad to transmit messages to a remote location where a speech synthesizer reproduces a word. Typical of such systems is the invention described in U.S. Pat. No. 4,307,266 entitled COMMUNICATION APPARATUS FOR THE HANDICAPPED. According to that invention, a sender enters the appropriate position for the letter of the alphabet to be communicated. A second entry identifies which one of the plurality of letters attached to the telephone set which decodes the two digit code entry and converts the two-digit code to a standard machine readable format which can be displayed on a standard output device such as an alphanumeric display or, for blind persons, a braille or similar output message. The sending party can transmit the message to the receiving party by keying characters into a keyboard. Keyed-in characters are converted to speech by a speech synthesizer for transmission to the receiving party. In other words, the sender types the word in DTMF code and the resultant word is reproduced at the receiving station by synthesized voice. While the foregoing system may be useful for certain applications, it seems to be rather cumbersome, limited in its vocabulary, and relatively inefficient in its transmission mode.

Other patents which discuss use of DTMF codes for transmission purposes include U.S. Pat. Nos. 4,087,638; 4,427,848 and 4,608,460.

Some attempts have been made in the prior art to identify a word from a DTMF dial tone clue. A useful description of such techniques is found in a article entitled "Digital Techniques for Computer Voice Response: Implementations and Applications", Lawrence R. Rabiner, Fellow IEEE and Ronald W. Schafer, Senior Member, IEEE PROCEEDINGS OF THE IEEE, Volume 64, No. 4, April 1976.

Of more general interest is an article entitled "Alphabetic Data Entry Via the Touch-Tone Pad: A Comment", Sidney L. Smith and Nancy C. Goodwin, The Mitre Corporation, HUMAN FACTORS, 1971, 13(2) Page 189-190.

Of general interest also are the following items from the patent literature: U.S. Pat. Nos. 3,778,553, 3,967,273; 4,012,599; 4,191,854, 4,426,555; 4,532,378; 4,557,062; 4,585,908; 4,608,457 and 4,633,041 as well as the following British Patents: 1,320,895 and 1,320,896.

Whether taken individually or as a whole, none of the prior art appears to suggest the novel apparatus and method set forth in this disclosure for efficiently identifying a word typed on a DTMF keyboard and converting that word into ASCII digital format so that it can be efficiently transported via a packet transport network to a remote location where it is converted from data to speech or otherwise delivered such as to a telex.

SUMMARY OF THE INVENTION

Briefly described, the invention comprises a method and apparatus for determining the identity of a word entered on a DTMF pushbutton pad by identifying letters according to their frequency in groups of n letters where n preferably equals two or three but can be much larger. A word is typically entered on a DTMF pushbutton pad one letter at a time. Six (6) of the numbered buttons on the DTMF pad correspond to three (3) letters of the alphabet and button #7 is PQRS and button #9 is WXYZ. The number string is compared against a dictionary of words in internal memory. The system feeds back the guessed word is rejected by the sender or from the dictionary to the sender to determine if the guessed word is correct. If the guessed word is rejected by the sender or is not found in the dictionary, the system next looks in a forward dictionary file and a reverse dictionary file for matches and if no satisfactory match is made, then it searches for groups of 3 letters referred to as Trigrams. The trigrams are preferably broken down into five (5) files, namely: Trigram I, which is a file for guessing the initial letter of a word; Trigram 2, which is a file for guessing the second letter of a word based upon the first letter of a previously guessed and confirmed alphabetic output string; Trigram 3, which is a file for guessing the third letter of a string based upon the first two letters of a previously guessed and confirmed alphabetic output string; Trigram Middle, which is a file employed to guess at the identity of any middle letter based upon the known identity of the previous two letters of a three letter string; and, finally, Trigram Final, which is employed to guess at the final letter of a word based upon the known identity of the previous two letters. The reason for employing five (5) Trigram files is because the initial, second, third and final letters of a word have different frequencies of individual occurrences and different frequencies of three letter combinations than letters in other positions in words. Using five (5) different files takes maximum advantage of the knowledge of the subject string in terms of each letter in its position within the word and within the context of its surrounding letters and/or digits.

If a Trigram record does not exist for a particular three letter string, then the system will default to analyzing groups of two letters referred to as Digrams.

The system can also be expanded to letter groups of size n where n is greater than two or three. The larger the group size n, the greater the word guessing accuracy, but such a system also requires substantial internal memory and substantial processing.

After all of the words of the message have been identified and converted into ASCii code, the system transmits the information via a packet transport network to a remote location where the ASCII code is converted by a digital-to-speech synthesizer to an audio output understandable to a receiver at the remote location or to one of several other delivery modes.

There are a variety of other applications for the basic word guessing technology that are discussed in detail in the Detailed Description of the Invention.

The invention may be further understood by reference to the following drawings.

BRIEF DESCRIPTION OF THE DRAWINGS

FIGS. 3, 3A and 3B illustrate the steps of the letter-at-a-time word guessing process.

FIGS. 3E and 3F illustrate the letter-at-a-time process involving digram and trigram searches.

FIG. 4A illustrates the method of generating Trigram files from dictionary files according to the preferred embodiment of the invention.

FIG. 4B and 4C are tables of the format and sequence of records in the Trigram files.

FIG. 6 illustrates the manner in which FIGS. 3E and 3F cooperate to perform the letter-at-a-time process involved in a digram and a trigram search.

DETAILED DESCRIPTION OF THE PREFERRED EMBODIMENT

During the course of this description like numbers will be used to identify like elements according to the different figures illustrating the invention.

Figure 1:
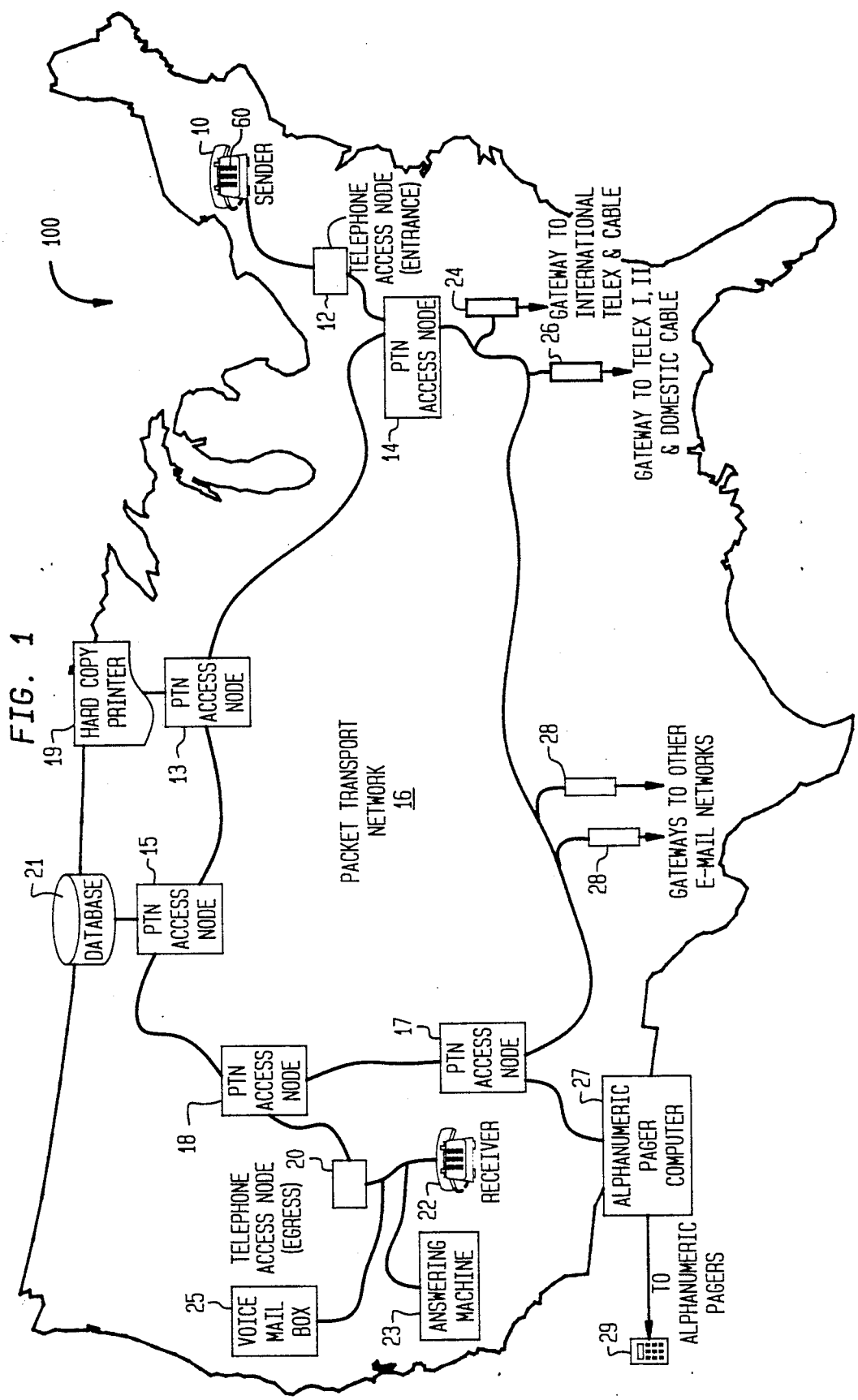
FIG. 1 illustrates an application of the telecommunication system according to the present invention in which two telephone access nodes are used to route a message over a packet transport network from a sender to a receiver.

FIG. 1 is a general schematic diagram of the preferred embodiment of the invention 100 showing how a message can be sent from a sender in the northeastern United States to a receiver 22 in the southwestern United States. The message will be delivered by synthetic voice via an ordinary telephone. FIG. 1 also illustrates potential alternative routing via gateways to destinations anywhere in the world and via a variety of different delivery modes including Telex, cable, alphanumeric pager and electronic mail.

Initially it is assumed that the sender 10 knows the telephone number of the nearest telephone access node 12 to him or her referred to herein as an entrance telephone access node. Entrance telephone access node 12 is connected by one or more telephone lines to a nearby packet transport network access node (PTN access node) which in turn is connected to a PTN (Packet transport network) 16. The telephone access nodes 12 and 20, in addition to their PTN connections are also connected to telephone networks associated with the sender 10 or receiver 22 or both. Each telephone access node 12 or 20 preferably includes multiple connections to the telephone networks so as to be capable of conducting many dialogues simultaneously. The entrance telephone access node 12 functions to provide both entrance and egress to and from PTN 16 via PTN access node 14. Node 12 is labeled "entrance" in FIG. 1 and node 20 is labeled "egress" because it is the function that they perform for the purpose of illustrating the invention 100. However, it will be understood that both nodes 12 and 20 are identical to each other and, their roles could be easily reversed if it was desired to send a message from receiver 22 to sender 10.

The caller or sender 10 initially dials up the closest telephone access node to him using the DTMF buttons 60 on his or her telephone instrument and the entrance telephone access node 12 will respond to the call. Telephone access node 12 then conducts a dialogue with the sender 10 concerning the preferred routing of the call. In this manner the sender 10 interacting with the entrance telephone access node 12 determines the preferred delivery mode of the message. The delivery may be by synthetic voice through a telephone, Telex I, Telex II, foreign or domestic cable, alphanumeric pager, FAX, computer printout or by electronic mail (E-Mail). This is possible because the entrance telephone access node 12 includes routing tables 46 which can route via multiple gateways and via multiple delivery modes.

If the receiver 22 has a Telex I or II, the access node 12 requests the sender 10 to enter the Telex number and optional answer back. Then, this part of the initial dialogue is completed. If the delivery is to be via voice over the telephone, the entrance telephone access node 12 asks the telephone number of the receiver 22. The telephone number may represent a voice telephone instrument or a computer equipped with a modem if the delivery mode is dial-up E-mail. The E-mail option can also be accomplished by soliciting the network membership and mail box identification number of the receiver 22. IF the receiving device is an alphanumeric pager, the dialogue will request the pager number.

The dialogue can be further continued to request from the sender, requiring only "Yes" or "No" answers, his or her preference for options such as proof of delivery or other additional parties that he or she wants to receive the message. If additional parties are to receive the message, then the entrance telephone access node 12 will request additional Telex, pager or telephone numbers.

The foregoing discussion assumes Telex routing is made possible by gateways between the packet transport network and the Telex network. Therefore, this discussion concentrates on routing to the receiver 22 with a telephone through the use of synthetic voice. This discussion also assumes that if the message is to an alphanumeric pager or to other delivery methods, that this fact will be made known to the computer by an access means such as a special telephone number or by the dialogue between the sender and the synthetic voice function of the sending telephone access node.

If the sender 10 enters a choice for a voice message the receiver's 22 telephone number, the entrance access node 12 will examine a table to determine the PTN access node 18 nearest to the egress telephone access node 20 serving that telephone number. The table is composed of telephone number NPA-NNX'S and their associated approximate latitudes and longitudes. This table is referred to by the publisher, Bell Communications Research, as the "V-H" File (Vertical-Horizontal). Given this table and the listing of all of the access nodes in the system 100, the entrance telephone access node 12 will determine the PTN access node 18 which is closest to the receiver's telephone access node 20 which is in turn closest to the receiver's telephone number. According to FIG. 1, the selected PTN access node 18 is the closest to egress access node 20 which is closest to receiver 22. The word "closest" here is meant to refer to the lowest cost telephone call charge.

The entrance access node 12, having selected PTN access node 18 as the exit PTN access node, will address all of the packets it creates to that PTN access node for referral to egress telephone access node 20. This completes the entrance telephone access node 12 routing procedure for transmission from a sender 10 to a receiver 22 in the United States in the case of message delivery by synthetic voice.

The system 100 also has the capacity to deliver messages on alphanumeric pages 29, or on a voice mail box 25, or by printed mail from hard copy printers 19 or may access data bases 21.

Figure 2A:
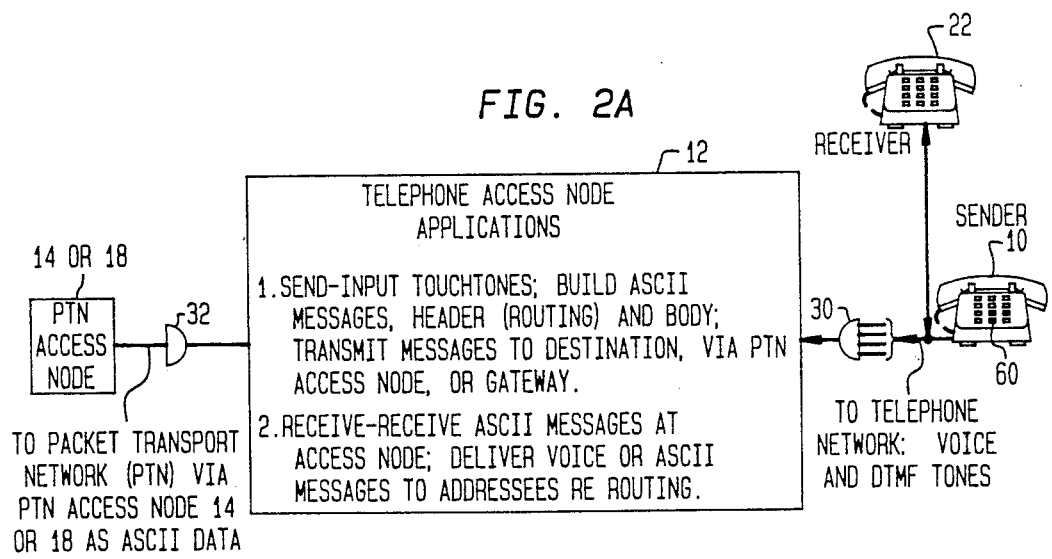
FIG. 2A is a general block diagram of a typical telephone access node.

FIG. 2A is a block diagram of a typical telephone access node 12 which can function as either an entrance telephone access node 12 or an egress telephone access node 20. A typical telephone access node 12 or 20 has multiple connections 30 to a standard conventional telephone network so as to be able to conduct many conversations with senders 10 and receivers 22 simultaneously. The standard conventional telephone network is not illustrated or discussed in detail in this disclosure since it is well known to those of ordinary skill in the art. The telephone access nodes 12 or 20 also include a data link 32 to PTN access node 14 which in turn connects with PTN 16.

In addition to its function of communicating with the standard telephone network and the PTN 16, the telephone access nodes 12 and 20 also discharge two general applications with respect to sending and receiving messages. These applications are described in greater detail in FIGS. 2B and 2C. The major functions supporting the sending and receiving applications are the prompter, speaker and dictionary functions. The prompter function "listens" to the DTMF tones sent by the sender 10 and guesses the meaning of the word entered by the sender 10. The speaker function relays to the sender 10 the guesses selected by the prompter function. The speaker function is performed in part by a conventional text-to-speech circuit board which can read the alphabetic data in the dictionary and pronounce the words in digital speech by interpretation of the characters contained in memory. Devices of this description are manufactured by Digital Equipment Corp., Texas Instruments and Natural Micro Systems. Software for this function is provided by Berkeley Speech Technology and others. The dictionary contains several thousand English words from which the prompter function selects its guesses.

After completing the routing procedure, the entrance telephone access node 12 will invite the sender 10 to type his or her message on the DTMF telephone buttons. The basic procedure followed by the sender 10 is to type on the DTMF keyboard buttons 60 as if the letters inscribed thereon were actually functional. The actual information transmitted by the sender's telephone to the telephone access node 12 is, of course, only one of twelve distinct tones per each button depression. The letters employed by the system are those commonly inscribed on the DTMF telephone buttons 60 with the exception that the letter Q is assigned to the 7 button (PQRS) and the letter Z is assigned to the 9 button (WXYZ). The letters Q and Z are usually not found on conventional telephone dials or DTMF buttons 60.

The pound sign (#) on the DTMF telephone buttons 60 represents, according to the preferred embodiment of the present invention 100, the space bar on a standard typewriter. Each time the sender's telephone transmits the tone combination for the # to the telephone access node 12, the telephone access node 12 will assume the sender 10 has finished typing a word. It will then guess the word and, using its speaker function, speak the word to the sender 10.

The prompter function has two clues which it uses to decipher a numeric string typed by the sender 10 into an alphabetic word, namely the number of digits and the digit string.

Initially, assume that the sender 10 types THE which the entrance telephone access node 12 receives as 843. The sender 10 then types the # after the 3, thus terminating the word and the prompter function will be in receipt of the string 843#. The prompter function contains a dictionary of a majority of the words in common useage in the English language in its random access memory. The sequence of the dictionary entries is by (1) number of digits in the word (word size) (2) string definition being the numeric equivalent of the alphabetic word emitted by typing on a DTMF pad, e.g. 843 for THE, and (3) possible meanings of the string sequenced by probability of use. According to the former example, the prompter function will contain an entry of word size 3 digits, the string 843, and, e.g. the words THE, TIE, and VIE which represent the three possible interpretations of the string 843 listed in the order of their frequency of use in the English language. The dictionary contains a list of words corresponding to each numeric combination (e.g., 843). The choice of words is based on their frequency and words will be carried in the dictionary until it is calculated that their frequency is below some predetermined threshold. This threshold is definable in expected occurrences per million words of text.

An acceptable source of words and their frequencies is the AMERICAN HERITAGE WORD FREQUENCY BOOK by Carroll, Davies, and Richman published by Houghton Mifflin Company. The foregoing book deals with frequencies encountered in eight million words of text.

According to the previous example, the most frequent interpretation expected of the string 843 is THE. The entrance telephone access node 12, using the speaker function, will speak the word THE to the sender 10. If THE is the correct interpretation for 843, the sender 10 will proceed to type the next word. If THE is not the correct interpretation for 843, the sender 10 will deny the guess by typing another #. The speaker 48 will then speak the next most likely word, in this example, TIE, If the sender 10 denies TIE by typing another # sign, the speaker 48 will speak VIE. If the sender 10 denies VIE, then the access node will announce to the sender 10 that it is shifting modes and will decode the word by reference to the Forward Dictionary 43a, Reverse Dictionary 43b, Trigrams 43e–43i, and Digrams 43c and 43d.

Given a particular numeric string such as 843, there are very few valid words that correspond to it. These valid words usually display widely divergent possibilities of use in English text. Therefore, guessing a word, given its size and numeric DTMF string, has been discovered to be an efficient and practical method for identifying words.

The dictionary function can be easily contained in the conventional equipment manufactured for micro-computers. An uncompressed dictionary of some 300,000 words can be contained in a memory board of 3 million bytes. In practice, some compression would be used, at a minimum to represent multiple forms of a verb in a single entry. For example, the word WALK, would represent walker, walking, walked, etc. Compression is useful because it minimizes computer memory. As the compression increases, the amount of memory will decrease but the response time will increase. The cost of RAM memory has become sufficiently low so that it may be preferable to minimize or eliminate the compression so as to maximize response performance and minimize software effort.

The foregoing has basically described the invention set forth in my co-pending application Ser. No. 07/126,630 entitled Packet Network Telecommunication System Having Access Nodes With Word Processing Capability" filed on Nov. 30, 1987. The major difference between the invention of this disclosure and the disclosure of my co-pending application Ser. No. 07/126,630 occurs where the word sought for does not appear in the internal dictionary. According to my co-pending patent application, the system would guess at each letter based upon that individual letter's individual frequency and feed that guess back to the sender. The sender would either approve or disapprove of the letter guess until the correct letter was identified. According to the invention of this disclosure, the system includes additional information about the frequency of an individual letter within a given string of n letters where n is at least two (2) and is preferably three (3) or more so as to further enhance the capability of identifying the word. Moreover, once the word is correctly identified, it will be automatically added to the memory of the system so that a second occurrence of the word will be automatically guessed at the next time that it is entered by the caller.

Figure 3B:
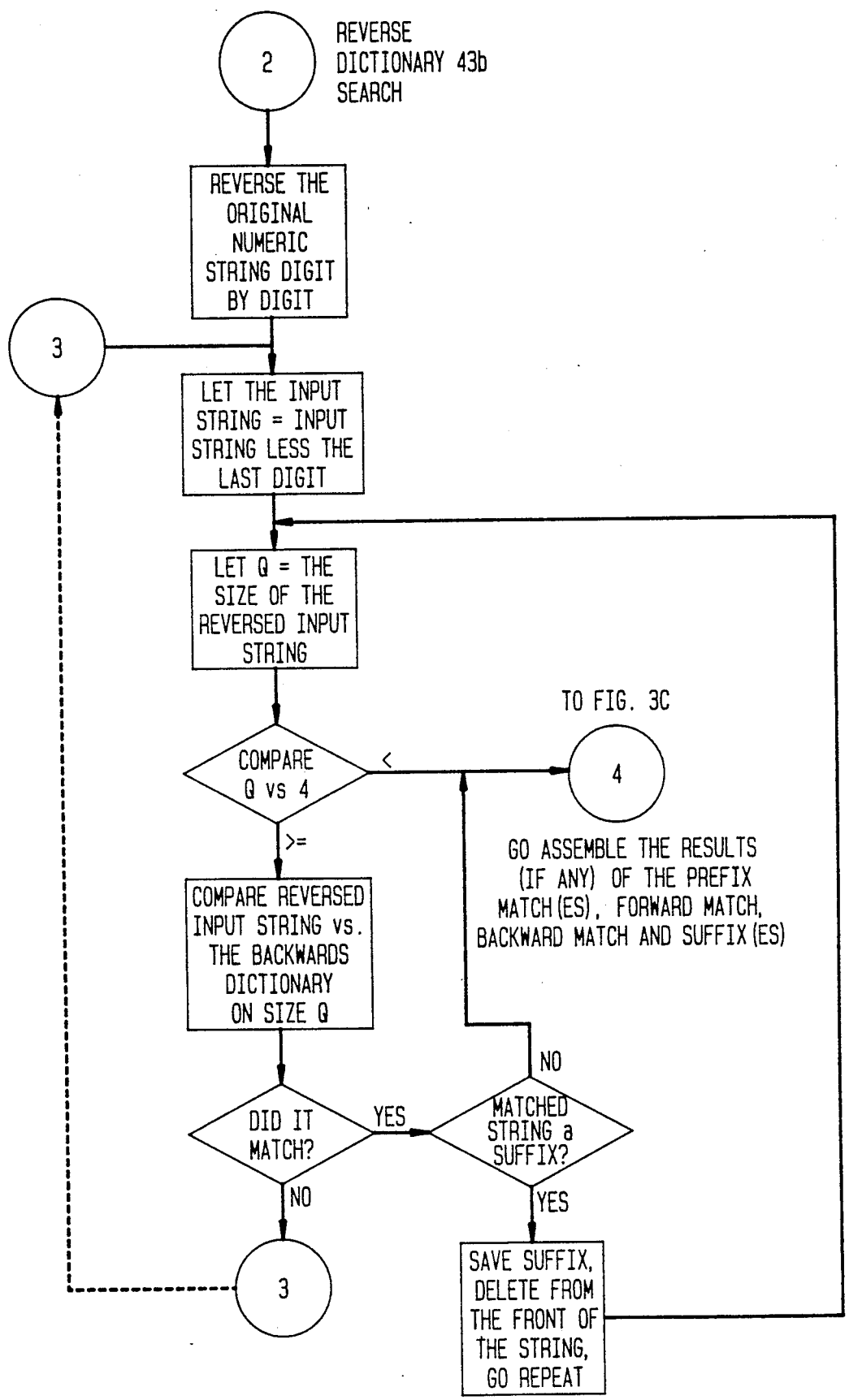
Figures 3C, 5:
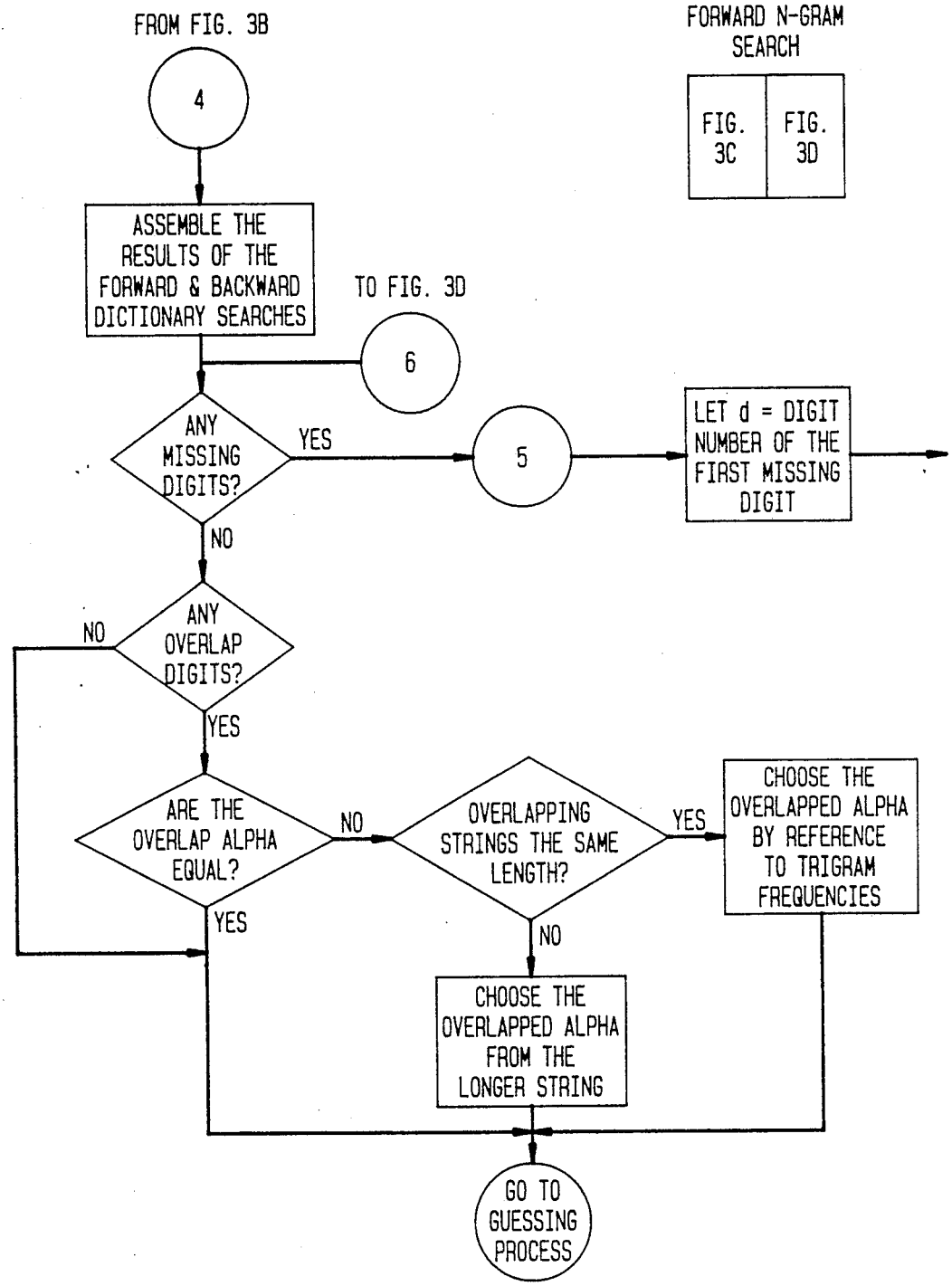
FIGS. 3C and 3D illustrate the steps of the letter-at-a-time process involved in a forward n-gram search.
FIG. 5 illustrates the manner in which FIGS. 3C and 3D cooperate to perform the letter-at-a-time process involved in a forward n-gram search.
Figure 3D:
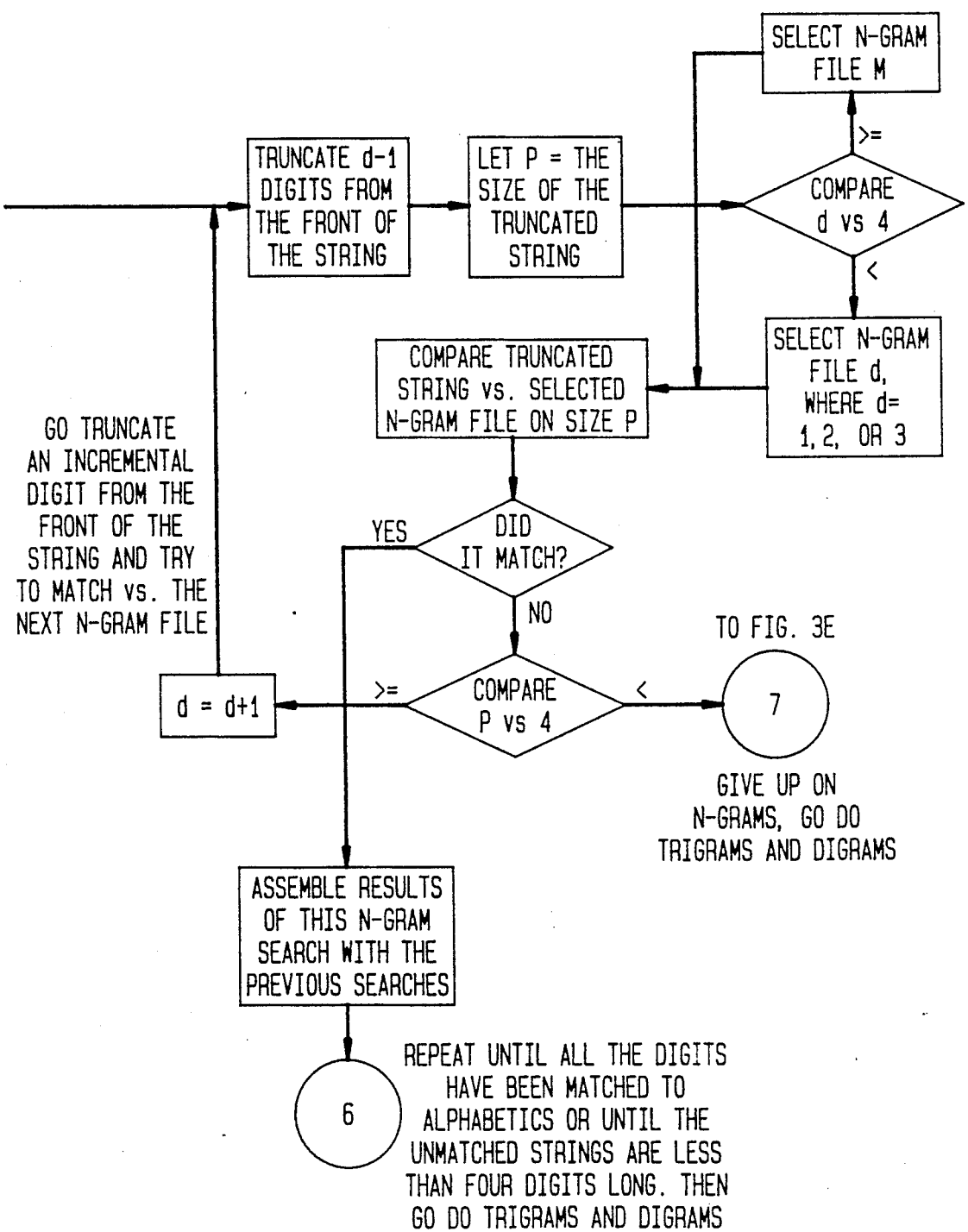

FIGS. 3A, 3B and 3C describe "Letter-at-a-Time" processing.

The invention employs a dictionary 42 of the 18,000 most common words in the English language selected according to their expected occurrence per million words of text. The expected occurrence per million words of text is associated with each word in the dictionary. The number 18,000 is arbitrarily chosen as this is the point below which words have an expected occurrence below one per million words of text. The dictionary represents over 95% of the words commonly used in English text.

If an input "DTMF numeric" string does not exactly match an entry in the 18,000 word dictionary, then the Letter-at-a-Time processing is performed. "DTMF numeric" refers to the numbers letters on the DTMF buttons, for example the 2 button has the letters A, B, and C; the 3 button has the letters D, E, and F and so forth.

The primary goal of translating from an input DTMF numeric string to a letter string of an unknown (not in the original dictionary) word is to minimize the number of guesses to achieve the intent of the user. However, the penalty assessed against an incorrect guess must be optimized against the amount of dictionary data and their storage and processing requirements.

The invention assumes that words which are not in the dictionary will have the same "structure" as words which are in the dictionary. This assumption applies to proper nouns as well as to common words but will not be as true for proper nouns as for common words. The reason for the diminished expectation of accuracy in processing proper nouns is that they are frequently of foreign origin whereas the dictionary is specifically based on English text. (Accuracy in processing proper nouns can be enhanced by including samples of proper nouns in the original dictionary taken from all possible ethnic derivations.) Structure is characteristic of a particular language and the structure involved in this discussion is peculiar to English in that the dictionaries are derived from English words. The general notions apply to any language but a different set of dictionaries is required for each language.

Given the expected occurrence per million words of text for each word in the dictionary, these words can provide the basis for the extraction of text "snippets" (letter sequences) which will have the same expected occurrences per million words as the words from which they are extracted. These snippets can be ordered and tabulated by their expected frequencies per million words of text so that for a given n-letter snippet, the expected frequency per million words of text for that snippet can be computed.

Two or three letter snippets are referred to as "digrams" and "trigrams". However, it is not necessary to restrict the construction of snippets to digrams and trigrams. "N-grams" can be extracted from the original dictionary which may be only one letter less than the words from which they are extracted. For example, the word DICTIONARY may be the source for an n-gram of DICTIONAR in which n=9. Also, taking the n-gram from the right side of the word will yield ICTIONARY which is also 9-gram.

The assumption is that letters occur in predictable frequencies, and that these frequencies are dependent in part on the position of a letter in the word. For example, the letter Q is more frequently found as the first letter of a word than as the last letter of a word. The particular letter positions addressed by this invention are the first, second, third, final, and "all-other" positions. Therefore, five sets of trigrams are used to guess the alphabetic interpretation of a DTMF numeric string.

This process can be compared to cryptogram puzzles which appear in newspapers and to military cryptography. In a cryptogram puzzle, a given letter represents some other letter throughout the complete puzzle. In military cryptography, a given letter (or other symbol) substitutes for another letter but the substitution is always changing and changing randomly. In this invention, 2 always means A or B or C, 3 always means D or E or F, etc. However a given digit, e.g., 2, can change its meaning from A or B or C anywhere in any word—i.e., it does not have a constant meaning as is the case in a cryptogram puzzle.

Summarizing the concept of "structure" as used in this context, a computerized dictionary of 18,000 words each associated with an expected occurrence per million words of text is used as the primary word source and also as a source of two special dictionaries—a Forward Dictionary and a Reverse Dictionary, and of trigrams each also associated with expected occurrence per million words of text. The composition of the two special dictionaries and of the trigrams and the associated expected frequencies per million words of text are defined as the "structure" of the language. Given knowledge of the structure of the subject language, the system can compute alphabetic guesses for DTMF numeric strings which are not part of the original 18,000 some words. The accuracy of the guess depends primarily on the length of the snippets pieced together to construct the guess—the longer the snippet, the more accurate the guess.

"Collisions" may occur. The word "collision" is defined to mean multiple alphabetic strings which translate to the same DTMF numeric string. A collision occurs when the system finds more than one alphabetic string corresponding to a given numeric string. The numeric string 66 is an example of a collision because it corresponds to ON or NO. Another example is 843 which corresponds to THE or TIE.

We assume that the probability of a collision decreases exponentially as the number of digits in a DTMF numeric string matched to the numeric equivalent of an alphabetic string increases. Conversely, the probability that a match is the one and only one correct interpretation of a DTMF numeric string increases exponentially as the number of string digits increases. The probability that there is more than one alphabetic string that is an acceptable (that such a word actually exists in some dictionary) interpretation of an input numeric string is approximately one in d (number of digits) raised to the third power of the number of digits. For a one digit match this is one chance in one, for a two digit match it is one chance in 2 to the 3 power or eight, etc. The number 3 is selected as the exponent because there are three alphabetic characters on each numeric DTMF button except for the 7-PQRS and the 9-WXYZ. The letters Q and Z occur so infrequently in English text as to be negligible in estimating probabilities. (This probability estimate ignores the redundancy in English language which tends to make the chance of success even more favorable). These probability estimates strongly suggest that the most successful system will be based on attempting to match the longest strings available from the Forward and Reverse Dictionaries derived from the original dictionary.

The resolution of collisions between words found in the dictionary is achieved by guessing the interpretation of the numeric string in the sequence of the expected occurrence per million words of text. For example, for the string 843, THE is the first guess and TIE is the second guess because that is the sequence of their expected occurrence per million words. The same process is used when guessing letters based on trigrams. If there are several trigrams which might translate to the given string, the best guess is achieved by guessing in the sequence of expected occurrence per million words of text. The strategy for guessing with n-grams is to find the longest n-gram which matches the input numeric string.

In the present embodiment of the invention, the system delivers a complete word to the caller via the text-to-speech unit if the caller's DTMF string exactly matches a dictionary entry or if the word can be pieced together by reference only to the Forward and Reverse Dictionaries. (These two dictionaries are described in the next paragraph.) Otherwise, the system delivers the word to the caller one letter at a time, i.e., it spells out one guessed letter at a time moving from left to right. Various improvements are possible. For example, several alphabetic interpretations of an input numeric string may result from the process of piecing together a word from the multiple sources of string interpretations. These can be temporarily stored according to their probability and if the caller rejects a word, then the system can then present the next most likely word. If the caller rejects all of the pieced together words, the system can back off to a single letter at a time presentation.

The Forward Dictionary contains the original 18,000 words arranged in DTMF numeric sequence and within identical DTMF numeric sequence by expected frequency per million words regardless of word size whereas the original 18,000 word dictionary is arranged primarily according to word size. (Note that the actual alphabetic character string does not participate in the sorting sequence.)

The Forward Dictionary is constructed by repeatedly truncating the least significant letter from each word in the original dictionary until the remaining string is four letters long. For example, from the word DICTIONARY, the truncation produces DICTIONAR, DICTIONA, DICTION, DICTIO, DICTI, and DICT. Each of these snippets has its original expected occurrence per million words associated with it as copied from the figure for DICTIONARY. Each of these snippets is sorted and the frequency figure tabulated together with identical snippets taken from the same character position of other words. For example, the snippet DICT is tabulated with the snippet DICT taken from the word DICTATOR. The result is a single occurrence in the Forward Dictionary of each snippet associated with its tabulated occurrence. As the snippets get smaller, the frequency figures will increase. The smallest frequency will be associated with DICTIONARY and the largest with DICT. The DTMF numeric is then computed for each snippet. For example, 3428 is computed for DICT. The tabulated snippets are sorted on the DTMF numeric so that the longest is encountered first in the searching. If several snippets exist with identical DTMF numerics, the snippet with the highest frequency is caused to be sorted first within the identical numerics. If the searching fails against the longest snippet, then the searching will try the next smallest and so forth until a match is made or until the search string becomes smaller than four digits.

Several variations can be applied to the above procedure. The truncation can terminate at five or six or more letters instead of at four. This would cause the strategy to turn to trigrams sooner than the present plan. The snippet DICT from DICTIONARY could be tabulated with the snippet DICT from INDICT, i.e, from a different letter position. (This suggests the construction of n-grams. The sorting could discard multiple snippets with identical DTMF numerics except for the first-the one with the largest frequency value. This is appropriate to the strategy of making only one word-at-a-time guess and then using trigrams and digrams to construct letter-at-a-time guesses.

The Reverse Dictionary also contains the original 18,000 words. The entries are reversed so that the word DICTIONARY for example, appears as YRANOIT-CID and the corresponding DTMF numerics are also reversed. The sequence is by reversed numeric and within identical DTMF numeric by expected frequency per million words. The construction of the dictionary is the same as the Forward Dictionary except that the letters are first reversed.

The trigram tables are built similarly to the Forward and Reverse Dictionaries with several variations. There are five tables, one for the first, second, third, final, and "middle" digit guessing. They are used for guessing one letter moving from left to right so the assumption is that there are two previously confirmed letters preceding each digit to be guessed. Thus, the search argument format for e.g, a Trigram M (middle) record is AAD meaning two Alphas which are known and one Digit which is to be guessed. The D in this example is a "middle" digit—not the first, second, third, or final. The function returned by the search is three guesses for the D listed in the sequence of frequency, highest first. In case there is no such record corresponding to an AAD, there will be less than three records returned from the search. An example is ZZ9 which would probably return no records at all. ZZ2 on the other hand, would return at least ZZA taken from MOZZARELLA if this word were in the original dictionary. ZZB and ZZC would probably not be in the table. If less than three records (one for each letter on the DTMF button or four in the case of 7 and 9) are returned, the Digrams are used to make up the difference.

Each of the five tables is constructed by extracting three letter snippets from the original dictionary. The snippets are included in one of the five files depending on the character position of the word from which they are extracted. Snippets taken from characters 1, 2, and 3 of a word are sent to Trigrams Initial. Snippets from 2, 3, and 4 are sent to Trigrams 2. Snippets from 3, 4, and 5 are sent to Trigrams 3. Snippets taken from the final letter of the word and the two preceding letters are sent to Trigrams Final. All other snippets are sent to Trigrams Middle. These are then sorted, the frequencies are tabulated, DTMF numerics generated and sorted again by DTMF numerics and within identical numerics by frequency, and stored in tables similarly to the Forward and Reverse Dictionaries.

There are some variations from the above procedure applied to building the Trigrams Initial and Trigrams 2 tables. For Trigrams Initial, it may be that the Reverse Dictionary search has provided one or two letters useful in the Trigrams Initial search. The one letter could be the third letter of the word. The two letters could be the second and third letters of the word. Therefore, the search argument formats could be DDD (no letters known of the first three in the word), DDA (the third letter is known from the Reverse Dictionary search), or DAA (the second and third letters are known from the Reverse Search.) The functions returned from the search will be formatted properly to respond to these search arguments. Naturally, the expectation of a proper guess for the D (the first digit of the Trigrams Initial record) will be more accurate if one or two letters are part of the search argument (DDA or DAA) than if the argument is DDD.

For Trigrams 2, it may be that the Reverse Dictionary search has provided the third letter of the word. (If the Reverse Dictionary search also provided the second letter of the word, then it would not be necessary to reference Trigrams 2). If the third letter is available, the search argument will be ADA, otherwise it will be ADD. (The first letter has been confirmed by the user after presenting him with the results of the Trigrams Initial search.) Similarly to the Trigrams Initial search, the Trigrams 2 search will be more accurate with the search argument format ADA than with ADD.

As illustrated in FIGS. 3A, 3B, and 3C, this invention uses the maximum length string available from a Forward Dictionary search, combining this with the maximum length string available from a Reverse Dictionary search, and then using forward trigrams and digrams to bridge (chain) the gaps which may remain after combining the forward and reverse alphabetic strings. The forward and reverse dictionary searching extracts prefixes and suffixes as a "by-product" of the searching.

The results of the combination of the two strings can be longer than the input string, shorter than the input string, or the same size as the input string. If the combined strings are longer than the input string, then the "overlap" letters may or may not match. If the overlap letters match, then this is further evidence that the correct and only correct interpretation of the input numeric string has been found. If the overlap letters do not match, the two alphabetic strings concatenated together may still be the correct interpretation of the input numeric string. If one or more letters overlap, the overlap letters are unequal, and the strings are not the same size, the overlap letter is chosen from the longer of the two strings. If the strings are the same size, the overlap letter is chosen by reference to a trigram or digram table to select the most likely alphabetic according to the frequency data. If the combined strings are the same size as the input string, then there are no overlap letters. If the two matched alphabetic strings are shorter than the input numeric string, then the gap between the forward string and the reverse string will be filled in by reference to trigrams and digrams.

Referring to FIG. 3A, the process is performed if the search against the original dictionary (the 18,000 words) fails. The first search in FIG. 3A is made against the Forward Dictionary. Since the original search against the 18,000 words is known at this point to have failed, this search begins with truncating the last digit from the input string and attempting to find a match against a Forward Dictionary entry one character shorter than the input string.

It will be useful to follow the process with an example Suppose that the input numeric string is 34726837437 intended to mean DISCOVERIES and that DISCOVERIES is not one of the 18,000 words. The words DISCOVER and CHERRIES are assumed to be contained in the 18,000 words and are thus also in the Forward Dictionary and the Reverse Dictionary. At circle #1, the final 7 is truncated from the input string and the size of the now truncated string is computed as S=10. The Forward Dictionary is searched with the argument string size of lo but no match is found on the 10 digit string. The string size is reduced by one and the next least significant digit, 3, is truncated from the tail of the numeric string. Searching against the Forward Dictionary continues until a match is found when S=8 and the alphabetic interpretation is DISCOVER. DISCOVER is saved and the process continues at circle #2.

The string is reversed so that it is now 73473862743 and it is in the proper format to match against the Reverse Dictionary. As in the Forward Dictionary search, the string is truncated and the search is made with size Q. This is repeated until a match is made when Q=4 against 7347 which corresponds to RIES, the last four letters of CHERRIES (which is entered in the Reverse Dictionary as SEIRREHC).

Reference is made to prefixes in the Forward Dictionary Search and to suffixes in the Reverse Dictionary Search. There is an auxiliary dictionary of some 40 prefixes (e.g., anti-, circum-, hyper-) and some 80 suffixes (e.g., -hood, -meter, -ious). If a search produces an exact match against a prefix or suffix, then the prefix or suffix is truncated from the input string and the search is repeated with a new argument string. This allows the system to decode words such as ANTIESTABLISHMENT and CIRCUMNAVIGATE, even though they may not be in the dictionary per se.

In FIG. 3B, if the system can guess an alphabetic interpretation of the complete numeric string using only the Forward and Reverse dictionaries with n at least four for both strings, then the system will guess the word and speak it to the caller as if it had been found in the original dictionary. If the system requires trigrams and/or digrams to guess the alphabetic interpretation of the numeric string, then it will speak the word to the caller a letter at a time.

In FIG. 3B, the results of the Forward Dictionary search and the Reverse Dictionary search are assembled and seen to be DISCOVER and RIES. Since S=8, Q=4, and the input string is 11, there is a one digit overlap. This overlap is the digit 7 which is equated to the letter R, the final letter of DISCOVER and also to R, the initial letter of RIES. Since the overlapping letters are the same, the assumption is made that the numeric string has been successfully interpreted and the system will speak the word DISCOVERIES to the caller.

In FIG. 3B at circle #2, the process of filling in gaps in the results of the Forward and Reverse Dictionary searches is begun.

FIG. 3C-3F diagrams the process used if the Forward and Reverse Dictionaries did not yield a guess for the input numeric string. At circle #4, the first unsolved digit is located and its digit position denoted. The digit position determines which of the five Trigram files will be used to decode it. If the Trigram Files do not contain sufficient entries to provide a full Guessing Stage for each digit, then the final default, the Digram File is used to finish loading the stage. Since there are three letters per DTMF button, (except for 7-PQRS and 9-WXYZ) there must be three guesses to offer the caller per each button push he enters and they must be presented in the sequence of their likelihood as a successful guess. The Guessing Stage provides the mechanism for presenting each possible letter per numeric button in its proper sequence and for presenting the letters once and only once.

The guessing process of FIG. 3C-3F is one letter at a time whereas the guessing of FIG. 3B is a complete word using the assumption that a complete word guess had been successfully constructed from the Forward and Reverse dictionaries.

The following is an example of the letter-at-a-time process for deciphering an known DTMF numeric string by reference to the Forward and Reverse Dictionaries derived from known dictionary entries.

EXAMPLE 1

The length of the combination of the matched forward string plus the matched backward string is greater than or equal to the length of the input string.

| UNKNOWN STRING | 72887329 | (intended to be SATURDAY) |
|---|---|---|
| | ... | |
| | 72823 | SAUC(e) |
| FORWARD DICTIONARY | 728876 | SATUR(n) |
| | 72887 | SATU(rn) |
| | 7288 | SAT(urn) |
| | 7297 | RAYS |
| | ... | |
| | ... | |
| | 92368 | (t)ODAY (reversed-YADOT) |
| REVERSE DICTIONARY | 923738739 | (y)ESTERDAY (reversed=YADRETSE) |
| | 924 | (h)AY (reversed=YAH) |

Step 1: Match the unknown string against the longest string available from the Forward Dictionary which is 72887 of SATUR(n).
Results of forward match:

| UNKNOWN STRING | 72887 matched, 329 unmatched |
|---|---|
| FORWARD DICTIONARY | 72887 SATUR(n) |

Step 2: Reverse the digits of the unknown string.
Results of reversal of the digits of UNKNOWN STRING: 92378827
Step 3: Match reversed digits against the longest string available from the reverse dictionary.
Results of reversed digit match:

| UNKNOWN STRING | 9237 matched, 8827 unmatched |
|---|---|
| REVERSE DICTIONARY | 9237 (YADRestsey) |

Step 4: Reverse to the forward direction those digits that matched the REVERSE DICTIONARY together with the corresponding letters.
Results of reversal: 7329 RDAY
Step 5: Concatenate the forward matched string with the reverse matched string. Concatenate the corresponding letters of the forward matched string with the corresponding letters of the reverse matched string. The overlaps are indicated in the results below by the vertical bars (|).
Results of concatenation:

Forward String: 7288|7|   SATU|R|   }

| -continued | | | | |
|---|---|---|---|---|
| Reverse String | \|7\|329 | \|R\|DAY | } | SATURDAY |

Step 6: Note the overlapping digits (inside the vertical bars) between the two string and note whether the corresponding letters are the same. If the digits are the same, no further processing is necessary.

If the digits are not the same, one or the other must be chosen for the guess. (This example of SATURDAY will be used even though the 7 digit represents an R in both strings).

If the strings are of different lengths, take the letter from the longest string, in this case, the SATUR. If the strings are the same lengths, refer to the expected frequencies per million associated with the two strings and chose the letter from the string with the highest frequency. (Recall that the n-grams are stored together with their expected occurrence per million words of text.

EXAMPLE 2

Figure 3F:
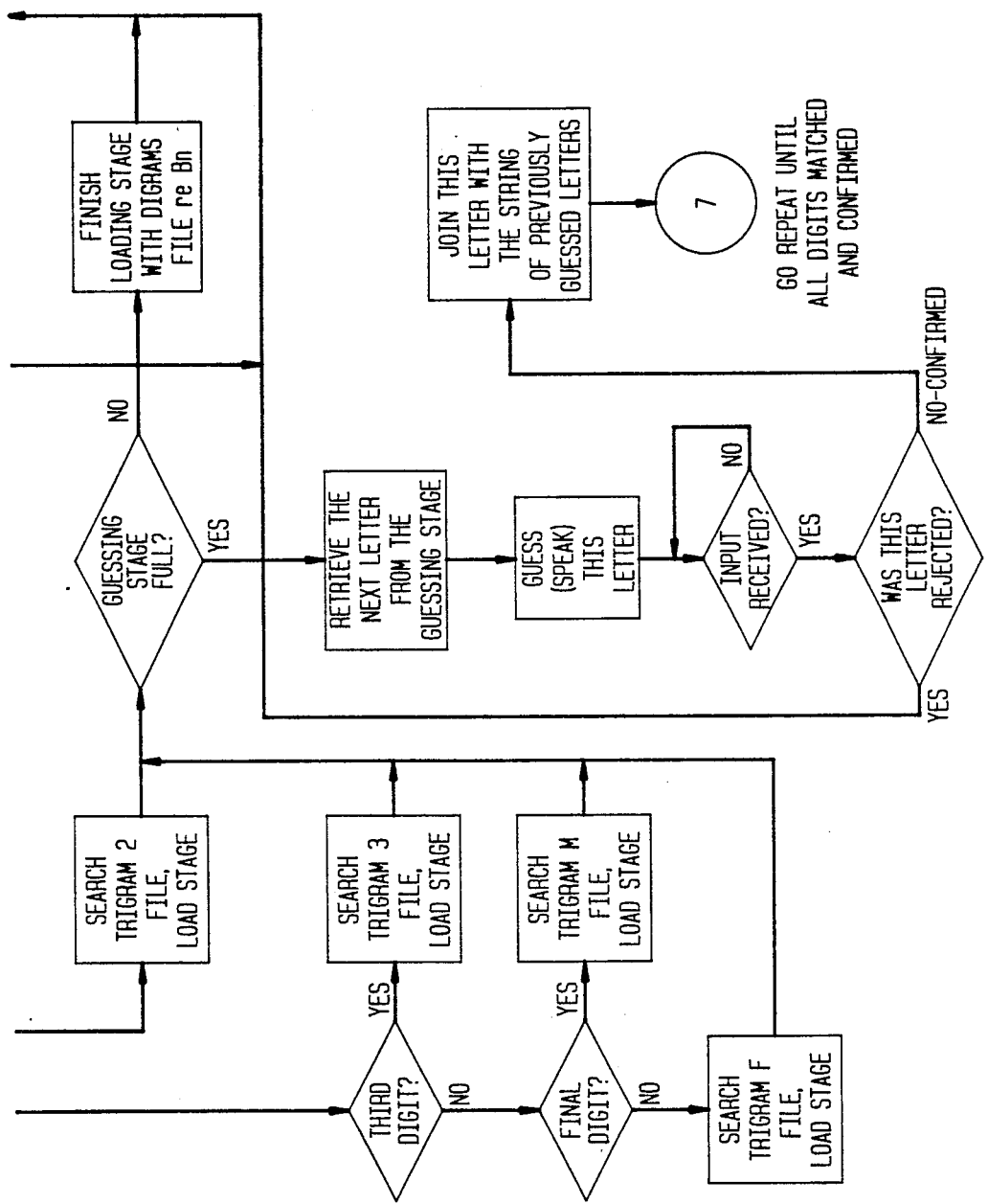

The length of the combination of the matched forward string plus the matched backward string is less than the length of the input string. In this case, there are one or more unmatched digits. These are processed by further reference to n-grams until the length of any substring is less than four digits. Then the remaining unmatched substrings are decoded by reference to trigrams and digrams as illustrated in FIGS. 3E and 3F. The trigrams will usually decode any unmatched digits (except for foreign proper nouns and words) and the digrams are the final default reference. The digram table contains every possible combination of two letters.

The basic dictionary building system illustrated in FIGS. 4A and 4B is used to build the following dictionaries.

Figure 2B:
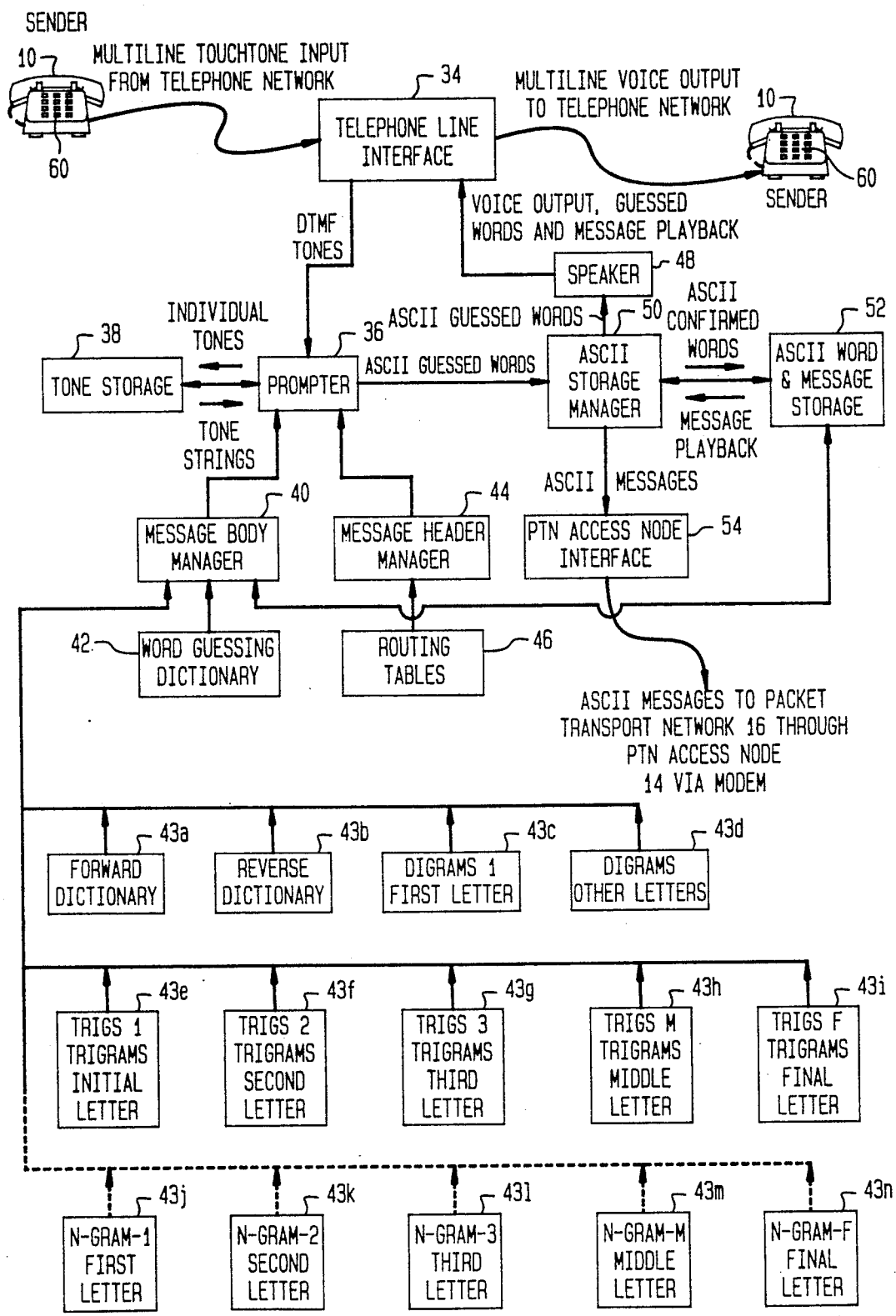
FIG. 2B is a detailed schematic illustration of the telephone access node illustrated in FIG. 2A as shown in the context of its SEND application.
Figure 2C:
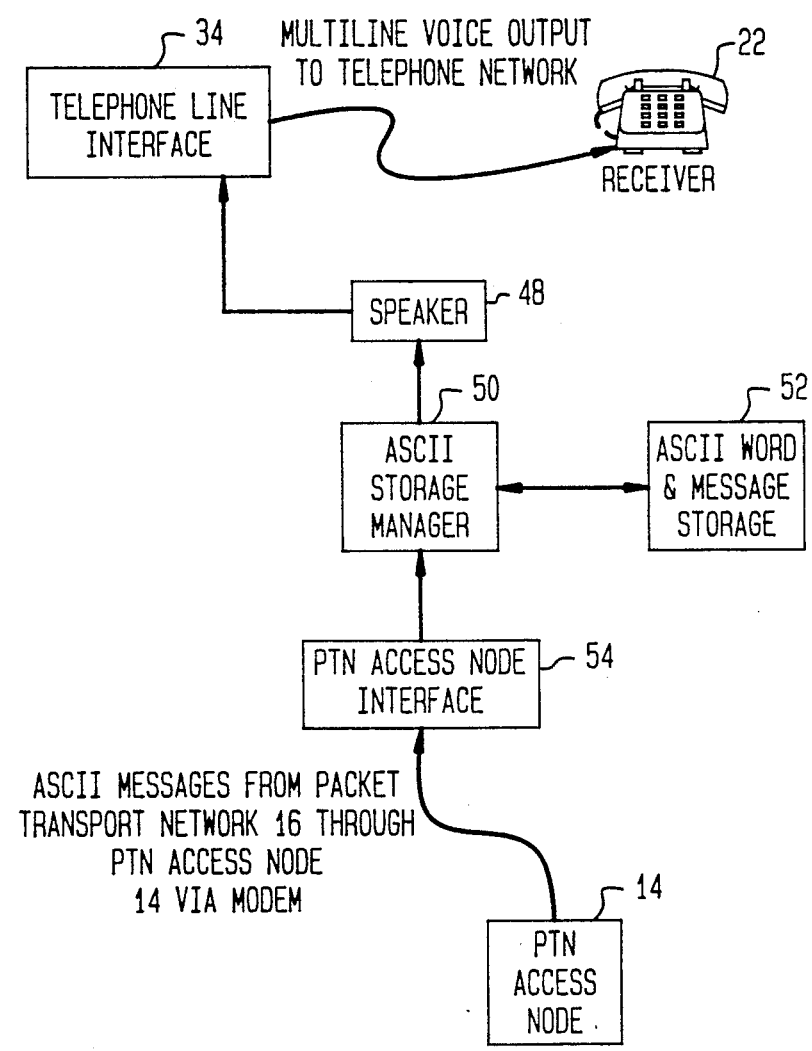
FIG. 2C is a detailed schematic illustration of the telephone access node illustrated in FIG. 2A as shown in the context of its RECEIVE application.

The basic system illustrated in FIG. 2B and described in FIGS. 3A-3C includes a group of dictionary files 43a-43n which are discussed in detail as follows:

Original Word Guessing Dictionary 42

This is the original set of 18,000 some words in ascending sequence of size, DTMF numeric translation and within DTMF numeric translation sequence in descending order of their expected occurrences per million words of text (EM). For example, the words DOG and FOG would appear in the section of the dictionary for three letter words as:

364, 23, DOG 364, 14, FOG assuming that 23 and 14 were the EM associated with DOG and FOG respectively.

Forward Dictionary 43a

This is the original set of 18,000 some words in ascending sequence of DTMF numeric translation and within their DTMF numeric sequence in descending order of their expected occurrences per million words of text (EM). Word size is secondary to DTMF in this dictionary whereas it is the prime sequencing criteria for the original dictionary. The words are sequenced the same way as they would be in an ordinary dictionary with the exception that they are sequenced on DTMF numeric instead of the actual alphabet. The sequence is arranged so that longer strings taken from a given word fall before shorter strings taken from the same word. For example, DICTIONAR (the numeric is 342846627) would fall before DICTIONA (the numeric is 34284662). The sequencing of longer strings before shorter strings is what allows the longest string possible to be matched against the Forward Dictionary. For equal strings, e.g., two strings of 34284662 which have different alpha translations, the string with the highest EM falls first.

The Forward Dictionary file is constructed by taking each word in the Original Dictionary and successively truncating the final character to make a new record until the new record is four characters long. For example, the original entry DICTIONARY would provide the records DICTIONAR, DICTIONA, DICTION, DICTIO, DICTI, and DICT.

After each word is taken and truncated and sent to a file together with its EM, the records with equal DTMF numerics are tabulated and their EM are added together to produce the total EM for that alphabetic-numeric string combination. Thus, if there are two strings, 34284662 each with a different alphabetic equivalent, the EM associated with each string are the total EM taken from all strings with the same alphabetic and thus the same numeric. For identical numeric strings with different alphabetic strings, the string with the highest EM occurs first.

Reverse Dictionary 43b

This is the dictionary obtained by reversing the letters of all the words of the Original Dictionary and then continuing to produce the dictionary in the same way as the Forward Dictionary.

Trigram Files 43e-43i

There are five trigram files: TRIGS 1 43e; TRIGS 2 43f; TRIGS 3 43g; TRIGS M 43h and TRIGS F 43i; also referred to respectively as: Trigrams Initial; Trigrams 2; Trigrams 3; Trigrams Middle and Trigrams Final. The reason for using five files is that letters have different expected frequencies of occurrence depending on their positions in a word. The particular letter positions considered to have special frequencies associated with them are the first, second, third, and final positions in a word. These four positions have special trigram files for guessing unknown digits in these positions and there is a fifth file for "all other" digit positions.

The format of a search argument into a trigram file is usually AAD where AA represents two known alphabetic characters and D represents an unknown digit which is to be guessed by reference to the trigram files. The AA are known because the guessing proceeds from left to right when using the trigram files and the letters are presented to the caller one at a time for confirmation or denial.

Trigrams Initial 43e and Trigrams 2 43f have special search arguments because for these two files, there are not two known alphabets available to use as the search argument. These two files may be used in searching input DTMF strings which have previously matched the Reverse Dictionary (but not the Forward Dictionary) and possibly picked up one or two alphabetic characters in the second and third character positions.

If no alphas were retrieved by the Reverse match, then the format of a search argument against the Trigrams Initial File 43e is DDD, i.e., three numeric Digits because no alphas are known. If the third character was retrieved by the search against the Reverse Dictionary, then the search argument format is DDA (two unknown digits and one known Alphabetic). If the second and third characters were retrieved by the search against the Reverse Dictionary, then the search argument format is DAA (one unknown Digit and two known Alphabetic).

Trigrams 2 43f may have a search argument format of ADD if no character was located in the Reverse search or ADA if the third character was matched in the Reverse search.

The sequence of the trigram files 43e-43i is numeric or alphanumeric search argument as above, totalled EM, and three or four guesses for each DTMF digit depending on whether the digit is a 7 or 9 (four guesses) or otherwise (three guesses).

Digram Files 43c and 43d

The Digram File 43c and 43d is a set of two letter pairs which combine each letter of the alphabet with every other letter of the alphabet sequenced according to their expected appearance on the DTMF keypad. There are 26 times 26 entries which is every possible combination of two letters. The Trigram files 43e-43i will not necessarily have an entry for every possible letter combination but the Digram File 43c and 43d does. It is the fall-back tool used to guess the meaning of a DTMF digit if the Original Dictionary 42, the Forward Dictionary 43a, the Reverse Dictionary 43b, and the trigram files 43e-43i do not provide adequate input to enable a guess for a DTMF digit. The Digram Files 43c and 43d are produced from an independent data source, not from the Original Dictionary 42.

The format of a search argument to the Digram File 43c and 43d is AD where A is a previously confirmed Alphabetic character and D is an unknown Digit from 2 to 9. The functions returned from searching a Digram File 43c and 43d are the guesses for the unknown digit. There are three guesses for an unknown digit listed in order of their expected frequency. For example, for the argument T4, the search of the Digram File 43c and 43d yields three records in the sequence TH, TI, and TG. (The digits 7 and 9 are expected to return four digits because there are four letters on these two buttons.) The Trigram files 43e-43i may not yield a complete "set" of guesses for a digit, e.g., H, I, and G, for the T4 search but the Digram files 43c and 43d is constructed to contain an exhaustive listing for every possible interpretation of the unknown digits. This is why the Digram Files 43c and 43d are referred to as the "final default".

There is a special Digram File 43c with 26 entries called Digram Initial. This is used for the first letter of the word when there is no alphabet to supply the A of the AD format. The search argument is just D. The Digram Initial File 43c (as well as the other Digram File 43d) are expected to be used infrequently as the system first refers to the Forward Dictionaries and the Trigrams 43e-43i.

N-GRAM FILES 43j-43n

N-Gram-Initial File [N-Gram 1) 43j

The first letter of an entry in the N-gram Initial File 43j is the first letter of the dictionary entry from which it was extracted. "Initial" refers to the letter position in the word from the n-gram was extracted. "Initial" is the first letter of the word. Separate n-gram 43j-43n files are maintained for five different letter positions because the frequency of occurrence of a letter depends in part on its position in a word. N-gram files 43j-43n are maintained for n=initial, second, third, final, and other than these four. Therefore, there are five n-gram files in addition to the original dictionary plus the reverse dictionary. There is also the digram file which is used as the last resort default in decoding a digit string.

The last letter of an entry in the N-Gram Initial File 43j is the next-to-the-last letter of the dictionary entry from which it was extracted. The last letter is not included because the search against the original dictionary containing the entry, e.g., SATURDAY, has apparently failed or the system would not be using n-grams.

The EM is taken from the dictionary entry.

Example: The n-gram SATURDA is extracted from the dictionary entry SATURDAY. The EM of SATURDAY is, e.g., 243, which is also applied to the n-gram SATURDA. THe n of the n-gram SATURDA is 7-gram I (I meaning "Initial"). SATURDA is a seven letter n-gram whose first letter is the first letter of the dictionary entry from which it was extracted.

N-grams are tabulated together with duplicate n-grams having the same letter position and their EM are tabulated. If another original entry in the original dictionary was SATURDAY'S and the last three characters (Y'S) were truncated in the process of generating n-grams, then this SATURDA would be compared to the first SATURDA, found to be equal, and the EM of the two occurrences of SATURDA added. If the EM of SATURDAY'S were 101, then the tabulation process would yield a single entry of SATURDA and its EM would be the sum of 243 and 101=344.

The process of generating entries for the N-Gram-Initial File 43j continues with successively truncating the last letter of each original dictionary entry. For example, the successive truncation of SATURDAY yields SATURDA, SATURD, SATUR, SATU, and SAT each with the associated EM of SATURDAY. The process stops when the remaining letter string is three characters long. Each entry stops resulting from the truncation process is tabulated against identical letter strings. As the letter strings get shorter and shorter, e.g., from SATURDA to SAT, the EM totals get higher and higher.

The final operation in creating the n-gram files 43j-43n is to generate the DTMF numeric equivalent from the letters, sort on the numeric equivalents in ascending order and the summarized EM in descending order. The alpha does not take part in the sort as it is now unique (only one occurrence of a given alpha string) because of the tabulation. There would be perhaps five entries having the same numeric equivalent, 728, of which SAT was one. They would appear in the N-Gram Initial File 43j as:

728, 564, SAT 728, 521, SAU 728, 493, SAV 728, 447, RAT 729, 321, PAT

In the decoding process if it was required to decode the string 728 and 728 were the initial three digits in the word, then SAT, SAU, SAV, RAT, and PAT would be the most likely interpretations of 728 in order of their expected EM. The attempted decoding of 728 would only occur after failing to decode the longest possible string in the input numeric. I the case of SATURDA for which the input numeric string is 7288732, the decoding process attempts to decode 7288732, then 728873, then 72887, then 7288, and lastly 728. The n-gram files 43j–43n are organized to facilitate the "longest string first" search.

N-Gram-2 File 43k

The first letter of an entry in the N-Gram-2 File 43k is second letter of the dictionary entry from which it was extracted. For example, from SATURDAY, the first entry in the N-Gram-2 file 43k is ATURDA. The entry is successively truncated as in 1.6 above yielding ATURD, ATUR, and ATU each with the associated EM of SATURDAY. These entries are tabulated and sorted as in 1.7 above to yield the N-Gram-2 File 43k.

N-Gram-3 File 43l

The first letter of an entry in the N-Gram-3 File 43l is the third letter of the dictionary entry from which it was extracted. For example, from SATURDAY, the first entry in the N-Gram-3 File 43l is TURDA. The entry is successively truncated as in 1.6 above yielding TURD, and TUR each with the associated EM of SATURDAY. These entries are tabulated and sorted as in 1.7 above to yield the N-Gram-3 File 43l.

N-Gram-M File 43m

The first letter of an entry in the N-Gram-M ("M" means "middle of the word") File 43m is any letter which is not the first, second, third, or last letter of the dictionary entry from which it was extracted. For example, from SATURDAY, the first entry in the N-Gram-M File 43m is URDA. This is truncated to yield URD. The next entry is RDA. Each entry is associated with the EM of Saturday. These entries are tabulated and sorted as in 1.7 above to yield the N-Gram-M File 43m.

N-Gram-F File 43n

The last letter of an entry in the N-Gram-F ("F" means "final letter of the word) file 43n is the final letter of the dictionary entry. The entries are stored in reverse order. This makes them available for retrieval from the right side of the word moving in the direction from right to left. For example, from SATURDAY, the first entry in the N-Gram-F File 43n is YADRUTA. The entry is successively truncated yielding YADRUT, YADRU, YADR, and YAD, each with the associated EM of SATURDAY. These entries are tabulated and sorted as in 1.7 above to yield the N-Gram-F File 43n.

FIGS. 4A, 4B, and 4C illustrate in detail the method by which Trigrams are generated and employed in accordance to the preferred embodiment of the invention 200.

The improvement 200 lies in the method and apparatus for using tables of 3 letter groups called Trigrams and tables of 2 letter groups referred to as Digrams. The tables yield letter guesses which are spoken to the user 10 one letter at a time. The guesses can be denied by the user by pressing the # button or confirmed by taking no action.

An example of the manner in which the system is employed is described below. Initially, assume that the sender 10 wishes to send the word RICHARD to the receiver 22. Further, assume that the word RICHARD is not found in the dictionary 42 so that the system 100 switches to the letter mode. The string from the DTMF pad is 7424273.

Assuming that the match against the Forward and Reverse Dictionaries failed, the system 100 initially attempts to identify the word RICHARD using five (5) Trigram files referred to respectively as: TRIGS I (Trigrams I); TRIGS 2 (Trigrams 2); TRIGS 3 (Trigrams); TRIGS M (Trigrams Middle); and TRIGS F (Trigrams Final).

TRIGS I is used to guess at the first letter of a string based on the first three digits of a word. The argument of a TRIGS I record is the first three numeric digits corresponding to the first three letters of a word. The function of a TRIGS I record is a guess for letter #1 of the subject string. In this case, the argument of 742 for four TRIGSI records yields functions of e.g., R,S,P,Q which are the possible guesses for the 7 listed in order of their expected frequency in English. TRIGS I was derived from a study of over eight million English words.

The table was processed so as to add the numeric for the Trigrams. For example, the entry RIC (the first three letters of RICHARD) was processed to generate 742R-107.9. The 742 is the DTMF numeric equivalent of RIC. The 107.9 is the frequency of RICHARD per one million words of English text.

The Trigrams were sorted on the numerics (742) and reverse sorted on their frequencies (to make the larger numbers fall before the smaller frequencies e.g., 107.9 above) and tabulated to derive TRIGS I.

An entry of TRIGS I has the format nnnXf where nnn is the numeric string as in the example of 742 above. The X is the guess for the first digit of nnn as the R in the example of 742 R above. The f is the summation of all initial strings 742 for which the 7 was found to be the letter R.

An entry may be missing if it was so infrequent as to be missing from the original table of English Trigrams. For example, 742Q may not exist. There is a procedure for missing entries. If a single entry out of a possible three or four (the number of letters on a DTMF button) entries is missing, it is assumed to be the least frequent of the three or four possible entries. If one or more are missing, the system defaults to using the DIGRAMS table described below to supplant the missing entries expected from the Trigram tables.

TRIGS 2 is used to guess at the second letter of a string based on the first letter of a previously guessed and confirmed output string combined with the next two digits of the input strings. TRIGS 2 records have arguments of one letter plus two numeric digits. The TRIGS 2 function is a letter guess for letter #2 of the subject string (7424273). In this example, searching TRIGS 2 on R42 would yield three records with functions of I,H, and G which are the possible guesses for the 4 listed in the sequence of their expected frequency (occurrences per million words of text) in the English language. The expected frequency is included in each record. This is the frequency figure taken from the word from which the Trigram was obtained, i.e., in this case, RICHARD and tabulated together with other identical letter strings.

TRIGS 3 is used to guess at the third letter of a string based on the first two letters of a previously guessed and confirmed output string combined with the next digit of the input string. TRIGS 3 records have arguments of two letters plus one numeric digit. The TRIGS 3 function is a letter guess for letter #3 of the subject string (7424273). In this example, searching possible guesses for the 2 listed in order of their expected frequency in English and the expected frequency figures.

TRIGS M is used to process all the digits in the input string after digit 3—i.e., beginning at digit 4 and continuing to the next to the last digit of the input string.

Subsequent processing of 7424273 after referring to TRIGS I, TRIGS 2, and TRIGS 3 is accomplished by "moving a three digit window" over the input numeric string, one digit per move, from left to right and using the new digit plus the previously guessed two letters to guess the new digit by reference to TRIGS M.

In this example, the output string is RIC after reference to TRIGS 3 and the next digit to be processed is the 4 (meaning the H). The argument is IC4 and TRIGS M will yield the functions of e.g., H,I,G which are the possible guesses for the 4 listed in order of their expected frequency in English. The output string is then RICH and the next digit to be guessed is the 2 (meaning the A). This continues until the next to the last digit has been processed.

The reason for employing five files: TRIGS 1, TRIGS 2, TRIGS 3, TRIGS M, and TRIGS F is because the initial, second, third, and final letters of words have different frequencies of individual occurrence and different frequencies of three letter combinations than the letters in other positions in words. Using five different files takes maximum advantage of the knowledge of the subject string in terms of each letter in its position within the word and within the context of its surrounding letters and digits.

When the system guesses using TRIGS I, it knows that the letter to be guessed is the first letter of the word.

When the program guesses using TRIGS 2, it knows one letter and two numeric digits and it knows that the letter to be guesses is the second letter of the word.

When the program guesses using TRIGS 3, it knows two letters and one digit and it knows that the letter to be guessed is the third letter of the word.

When the program guesses using TRIGS M, it knows two letters and one digit and it knows that the letter to be guessed is after the third letter in the word but not the final letter of the word.

When the program guesses using TRIGS F, it knows two letters and one digit and it knows that the letter to be guessed is the final letter of the word.

The assumption inherent in the use of the Trigram files is that unknown words (words not in the dictionary) will have the same characteristics as those words which are in the dictionary. These are the characteristics of letter frequencies and furthermore, frequencies depending upon position within a word. The choice of a guess for an unknown digit is primarily constrained by the restriction of the relation of the letters to the digits on the DTMF dial. For example, if it is required to guess the letter for the digit "8", then it is known that the letter must be one chosen from the set of T,U, and V. The employment of the Trigram files greatly enhances the probability that the choice will be the correct one.

FIGS. 4A diagrams the process of creating the Trigram files from the dictionary. The dictionary contains some 18,000 words in the English language together with their expected occurrence per million words of text. Words of four or less letters are excluded from the Trigrams population as they are all assumed to be included in the dictionary whereas the Trigram files are created for the purpose of guessing words which are not in the dictionary.

In the example of FIG. 4A, the word DISCOVERY is chosen to illustrate the process of creating the Trigram files.

The Trigram I Records are generated for the purpose of guessing the first letter in the string. The first three letters are converted to their DTMF numerics-i.e., the DTMF button on which they occur. In this case, DIS is converted to 347 which is stored in the Trigram I record. Then the first letter of the word, D, is inserted into the record. Then the expected occurrences per million words of text (265.8) is added to the record. The 347 is the argument and the D is the function. The dash is shown to illustrate what is known versus that is to be guessed when the record is referenced. The known data (e.g., the 347 or the 345 or the 3iS) is to the left of the dash and the data to be guessed (e.g., the D) is to the right of the dash. The use of the expected occurrences per million words of text (e.g., 265.8) will be explained below.

The Trigram 2 Records are generated for the purpose of guessing the second letter in the string. The argument to the left of the dash is D47 or D4S.

The Trigram 2 records contain one known first letter and two numeric digits representing two unknown letters, the second and third. The I to the right of the dash is the guess for the digit 4 of the 47 in this particular record. The expected occurrences per million words of text apply to this combination of letters and numbers. This frequency applies particularly to the I as a second letter and the string of D47 will have different statistics if the I is any letter other than the second in the string and if the first letter is other than a D and the third digit in the string is other than a 7.

The Trigram 3 records, Trigram N records, and the Trigram F records have the same format. The argument is two known letters and one unknown digit.

In the example of the Trigram 3 record, the argument is DI7 to the left of the dash and the function is the letter S to the right of the dash. The S is the guess for the 7 and the 265.8 is as above. The statistic applies particularly for the DI7 where the 7 is the third digit of the string and the DI are the first and second letters of the word.

In the example of the Trigram M record, the argument is SC6 to the left of the dash and the function is the letter O to the right of the dash. The O is the guess for the 6 and the 265.8 is as above. The statistic applies particularly for the SC6 where the 6 is not the first, second, third or final digit of the string and the SC are not the first or second letters of the word nor are they the third and second from the last letter.

Finally, there is the Trigram F record which is especially created for guessing the last letter of a word. This has the same format as a Trigram M record but the expected frequencies of the letters as corresponding to the digits are not the same at the end of a word as they are in the middle or beginning of a word. The statistic applies particularly for the ER9 where the 9 is the last digit of the string and the ER are the third and second from the last letter.

Four examples—DISPARATE, DIRECTLY, FISSURE, AND EGREGIOUS are shown as the source of Trigram I records which match dISCOVERY on the digits 347 but which have different functions for the first letter and different values for the expected occurrences per million words of text.

Processing the complete dictionary as described above produces five files—TRIGS I (Trigrams Initial), TRIGS 2 (Trigrams 2), TRIGS 3 (Trigrams 3), TRIGS M (Trigrams Middle) and TRIGS F (Trigrams Final). Each of these files is processed separately as follows:

a. Sort on the first four characters (letters or digits). In the example of Trigram 2 of FIG. 2, sort on the D47 plus the letter character which is an S or P or R or Q.

b. For all records having identical first four characters, tabulate (add up) the expected frequencies per million words and produce a single record with the total frequency for that combination of the first four characters.

c. Resort the tabulated records on the primary key of the first three characters. Sort on the secondary key in descending order of the totalled expected frequency per million words. Five sets of records of this description are shown in FIGS. 4B and 4C.

The results of these operations are shown in FIG. 4A ready to be loaded into the program tables. For each three character string (Trigram) made up of digits or letters and digits, there is a record containing its absolute frequency in terms of expected occurrence per million words. They are sorted according to the three digit string value and within a given string value according to their frequency. These five files are organized according to the DTMF button depression which requires a guess and according to its position in the string being processed.

Having the frequencies available, it is then possible to compute the probabilities that an anticipated letter guess will be correct. This probability per letter can be concatenated with the probabilities for all of the letters in the word and the probability that the complete word will be correct can then be computed. If this probability exceeds some threshold, then the whole word can be spoken to the user instead of using the letter mode to speak the word one letter at a time.

The probability that all the letters on a particular button contain the correct guess for a particular. DTMF button depression is 1.0 in total. For example, the probability that the correct guess is A, or B, or C for a DTMF button depression of "2" is 1.0. The probability that a particular letter choice is correct is the frequency for that letter divided by the total frequencies for all the letters on the button. In FIG. 4B in the example of Trigram I, the probability that D is the correct guess for the 3 of the 347 is the sum of 498.7 plus 311.6 plus 202.7 which is 1013 divided into 498.7 which is 0.49. The probability that the complete word would be correct if spoken (instead of speaking one letter at a time) is the product of the probabilities for all of the letters in the word.

In case one of the Trigram tables does not contain a searched entry, the system refers to a table of Digrams, DIGRAMS, which lists each of the twenty-six letters as the first letter of a pair combined with each of the twenty-six letters as the second letter of a pair. The argument to the table is a letter and a digit. The letter is the last confirmed one of the current alphabetic output string and the number is the next one of the current numeric input string. In the example of RICHARD, if IC4 had no entry in TRIGS3, then the system looks in DIGRAMS with the argument C4. The table would yield the functions, e.g., I,H, and G, which are the possible guesses for the digit 4 preceded by the letter C listed in order of their expected frequency. The DIGRAMS table is based on "Chart Showing FREQUENCIES of English DIGRAMS"—Prepared by O. Phelps Meaker which is an appendix to "Elementary Cryptanalysis".

These frequencies are not included in the computer tables as they are incompatible with the computations used to arrive at the Trigram table frequencies. Also, the expectation of using a Digram table entry is very low as the Trigram tables contain all but the most improbable combinations, e.g., QZ is in the Digram table and is used if required but is not expected to be used frequently if at all. The frequencies of the Digram table are recognized only in their relative values, i.e., in the example of C4 above yielding I,H,G, the letters are presented in that order due to their relative frequencies.

If the system uses a Digram table entry for letter guessing, then it will probably not attempt to guess a complete word at a time but will only guess a letter at a time. On the basis of the low frequency of reference to a Digram, the system may assume the frequency to be zero and make a whole word guess on that basis.

The system maintains a "Guessing Stage" when processing letters one at a time. This is a storage area where all of the letters for a given DTMF digit are assembled in the sequence in which they will be presented for guessing by the user. For example, if the digit to be guessed is a "2", then the stage will contain e.g., C,A,B which is the order of their frequency and the order in which they will be presented for guessing. The Stage is loaded by reference to the Trigram tables and possibly by reference to the Digram Tables. The stage is first loaded from the Trigram tables and if it contains all the letters for a DTMF digit, e.g., the three letters C,A, and B taken from the Trigram files then the load is completed. If a letter or letters is missing, e.g., the B because it was not present in the Trigram file, then the Digram file would supply the missing letter (not the frequency per million statistic.

The Guessing Stage is used to ensure that each possible letter is presented to the user for approval or rejection once and only once and in the proper sequence. If the user rejects ALL the letters of the stage, the system makes the assumption that the letters were spoken too quickly and that the user did not have time to reject the incorrect letters. In this case, the system increases the time available to the user to perform rejection and the whole stage is repeated for the rejected letters.

The user may reject a word at a time as well as a letter at a time. When a word is spoken to the user, the system waits a time-out period for a reject. If the system receives a reject (the user pushes the # button), it will present the next choice word to the user. For example, the system speaks the first choice THE. If the user rejects, it then speaks the second choice TIE. If no more words are available in the dictionary that match the current string (in this case, 843) then the system enters LETTERS mode. If no reject is received before the timer expires, the system assumes the word was correct.

If the # button is pushed after the timer expires, the meaning to the system is CANCEL THE LAST WORD. The system cancels the last word and assumes that the user did not have enough time to reject in the normal manner. It then extends the time-out period as described above.

Summarizing the improvements to letter-at-a-time guessing, the current patent discusses guessing single letters as isolated events, e.g., to guess an 8, the system would offer T,U, and V. The improvements encompass guessing digits in context of their surrounding digits, in the context of previously confirmed guesses of preceding letters, and in the context of their position within the subject string. The devices employed to execute this improved guessing procedures are the Forward Dictionary 43*a*, Reverse Dictionary 43*b*, Trigram 43*c* and 43*i* and Digram files 43*c* and 43*d* and may n-grams 43*j* and 43*n*.

There are a number of useful applications for the basic invention just described.

Alphanumeric Paging 29

The pager 29 is connected to the system 100 by an alphanumeric pager computer 27 and a PTN access node 17. Presently, pagers 29, illustrated in FIG. 1, also known as "beepers" can be classified according to functionality in several levels.

At the lowest level of functionality is the plain beeper 29. When the "beep" sounds, it tells the carrier of the beeper 29 to call his office. His office will then tell him who was trying to call him, the number to call, etc.

The numeric pager 29 displays the next higher level of functionality. When this machine sounds a "beep", the pager 29 displays a digital readout of the caller's telephone number. The carrier can then call this person directly instead of calling his office to find out who the person is.

Pagers 29 may receive and store voice messages similarly to telephone answering machines. The alphanumeric pager 29 displays the highest level of functionality. It receives and stores alphanumeric messages such as "Flight cancelled. What do I do now?" To send such a message, the sender calls an 800 (Inward Wide Area Telephone Service) number supplied by the paging company and dictates the message to an operator. The operator, using an alphanumeric keyboard, types the message into a computer 27 and the computer 27 sends the message to the recipient.

This technology of this invention allows transmission of alpha paging messages without the assistance of an operator and without the requirement to call an 800 number. The TAN (telephone access node) receives the message from the sender and interacts with him to ensure that the message is entered correctly. It then sends the message via a data network (rather than a voice network) to the paging company's computer which in turn sends it to the recipient. Thus, the technology disestablishes two costs—the cost of the operator and the cost of the 800 call.

Telex 24 and 26

It is generally accepted that an alphanumeric data entry device, such as a Telex terminal 24 and 26 shown in FIG. 1, is required in order to send a message to a receiving Telex terminal 24 and 26. This technology obviates the need for a sender to have access to a Telex 24 or 26 or other alphanumeric input device. The sender can enter the message using a DTMF keypad communicating with a TAN. The TAN interacts with the sender ensuring the validity of the message. The TAN converts the message to Telex format and sends it to the destination Telex terminal 24 or 26.

Electronic Mail 28

This application is similar to Telex 24 or 26 except that the DTMF telephone and TAN combination is substituted for a computer equipped with a modem. The caller can enter his message on a DTMF telephone without the need for using a computer. The TAN will transmit the message in the proper format to the recipient's E-Mail mailbox where it will appear to the receiving equipment as if it had been sent by communicating personal computer.

Telegrams and Cables 24 or 26

Telegrams and cables 24 or 26 are similar to Telex 24 or 26 messages except that the recipient does not have a Telex machine 24 or 26 to receive the message. Therefore, the message must be sent to a public telegraph office and then relayed to the recipient.

The present method of sending a telegram is similar to the method of sending an alphanumeric page as described as above. The caller must dial an 800 number and dictate the message to an operator who types it into a computer. The message is transmitted to the telegraph office nearest to the recipient. An operator in the destination office then calls the recipient and reads him the telegram.

This technology eliminates the need for the caller to make an 800 call, eliminates the need for an operator to type the message, and eliminates the need for the operator at the destination office to call the recipient. Using the technology of this invention, the caller calls the TAN nearest him and enters the message which is validated by interaction with the TAN. The message is transmitted by the caller's TAN to the TAN nearest the recipient. This TAN dials out to the recipient and reads the message to him using the synthetic voice function of the TAN.

Telephone Messages

Most telephone calls are not completed on the first attempt because the recipient is not located next to his telephone when the call attempt is made. What typically happens is that the recipient's secretary or his answering machine 23 takes a message which is primarily the caller's name and telephone number. This is the first step in a phenomenon called "Telephone Tag".

Rather than use expensive voice circuits just to leave a message with an answering machine or a secretary, the caller 10 can enter his message interacting with his local TAN. The local TAN sends the message to the recipient's TAN 20 which then dials out and delivers the message using the synthetic voice function of the TAN for delivery by a voice mail box 25. In this way, the same result is achieved at a much lower cost because the message was transmitted using a packet transport network at costs of cents per thousand bytes instead of a voice network. Additionally, if the recipient 22 does not answer the TAN call and does not have an answering machine 23, the TAN will keep periodically attempting to deliver the message. Thus, the TAN substitutes for a recipient's answering machine 23.

Database Access 21

Some examples of databases 21 which can be accessed using the present invention are telephone directory assistance, sports, weather, stock quotes, and entertainment, such as movie reviews, showtimes, and promotional messages.

Databases 21 are typically accessed using a terminal or a PC or by a voice call to a human operator. Some databases 21 can be directly accessed by a telephone call to a computer but they require the use of a code book and an 800 telephone call. For example, if a caller wants a quote on IBM, he must make an 800 call to the central database, he must look in his code book for the numeric code for IBM, e.g., 4112, and enter this on the DTMF keypad. The code book is required in this scenario because present systems only accept numeric (not alphabetic) input from a DTMF telephone.

This invention allows operator unassisted access to a database 21 with a local telephone call to a nearby TAN. No code book is necessary as the caller merely enters, e.g., IBM, and interacts with the TAN to ensure that the message is received correctly. The database 21 is connected to the network 200 by a PTN access node 15. The TAN then queries the central database via a packet transport network data call instead of an 800 voice call. Thus, this invention eliminates the need for a PC, eliminates the need for a code book, and eliminates the need for an 800 telephone call.

The United States Post Office nine digit zip code program is a specific example of a data base which could be made available for direct access using this invention. The database 21 comprises some 22 million records which are available to large volume mailers using computer matching software. The TAN can provide service to individuals desiring low volume retrieval of nine digit zips. The caller can access a TAN with a local telephone call and enter data such as state, city, street name and number. The local TAN will relay this information to the central database over a packet transport network. A central database computer will find the nine digit zip code and return it to the calling TAN which will then deliver it to the caller using the synthetic voice function.

Mail Delivery

Messages entered via a TAN will be transmitted to the TAN nearest the recipient anywhere in the world. The TAN can be equipped to print on a printer 19 and mail the message to the recipient. This is especially useful for countries which have sparsely deployed telegraph offices.

FAX

Messages entered via a TAN can be converted to facsimile format in the TAN or sent to a value-added network service provider which performs the conversion. In either case, the DTMF input message is delivered to the receiver's FAX machine.

While the invention has been described with reference to the preferred embodiment thereof, it will be appreciated by those of ordinary skill in the art that modifications can be made to the parts and steps of the invention without departing from the spirit of the invention as a whole.

I claim:

1. An apparatus for determining the identity of an input word of a specific language entered on a DTMF keyboard as a string of numbers, said apparatus comprising:
   a full word dictionary means for storing common words and the DTMF numeric strings corresponding to said common words;
   a forward dictionary means for storing full words and parts of words and the DTMF numeric strings corresponding to said full words and said parts of words, wherein said full words and said parts of words are selected and stored according to the length and frequency of occurrence in said specific language of said full words and said parts of words and wherein the letters of said full words and said parts of words are in their natural letter sequences;
   a reverse dictionary means for storing reversed strings formed by reversing the natural letter sequences of said full words and said parts of words and the DTMF numeric strings corresponding to said reversed strings, wherein said reversed strings and the DTMF numeric strings corresponding to said reversed strings are stored according to the length and frequency of occurrence in said language of said reversed strings;
   means for comparing the string of numbers corresponding to said input word with the numeric strings in said full word dictionary means; and
   means for comparing the string of numbers corresponding to said input word with the DTMF numeric strings corresponding to said full words and said parts of words in said forward dictionary means and with the DTMF numeric strings corresponding to said reversed strings in said reverse dictionary means,
   wherein said string of numbers corresponding to said input word is first compared against said DTMF numeric strings in said full word dictionary means and compared against said DTMF numeric strings corresponding to said full words and said parts of words in said forward dictionary means and said DTMF strings corresponding to said reversed strings in said reverse dictionary means if said input word is not found in said full word dictionary means.

2. The apparatus of claim 1 further comprising:
   letter subgroup examining means for identifying each letter of said input word by examining said string of numbers, said letter subgroup examining means comprising means to divide said string of numbers into groups of n numbers, means for storing snippets comprising n letters and numeric strings corresponding to said snippets, said snippets being selected and stored according to the frequency of said snippets in said language, means for comparing said groups of n numbers with said numeric strings corresponding to said snippets, wherein n is an integer and equals at least 2, and
   wherein said string of numbers corresponding to said input word is examined by said letter subgroup examining means if said input word is not found in said full word dictionary means, said forward dictionary means or said reverse dictionary means.

3. The apparatus of claim 2 wherein said letter subgroup examining means includes:
   an n-gram-initial file for identifying the first letter of said input words;
   an n-gram-2 file for identifying the second letter of said input words;
   an n-gram-3 file for identifying the third letter of said input words;
   an n-gram-M file for identifying any letter that is not the first, second, third or last letter of said input words; and,
   an n-gram-F file for identifying the final letter of said input words.

4. The apparatus of claim 3 further comprising:
   at least one digram file for storing in groups of 2, letters according to the frequency of occurrence in said specific language of said groups of 2 letters and for storing the DTMF numbers corresponding to said groups of 2 letters.
   wherein groups of two numbers of said numeric string corresponding to said input word are compared against said DTMF numbers corresponding to said groups of 2 letters in said digram file.

5. The apparatus of claim 1 further comprising:
   pager means for receiving a message comprising input words identified by said apparatus.

6. The apparatus of claim 1 further comprising:

voice mail means for receiving messages comprising input words identified by said apparatus.

7. The apparatus of claim 1 further comprising:
data base means interrogatable by said apparatus for providing data based upon input words identified by said apparatus.

8. The apparatus of claim 1 further comprising:
printer means for printing input words identified by said apparatus,
whereby messages printed on said printer means are deliverable by the postal service.

9. The apparatus of claim 1 further comprising;
E-mail means for receiving messages comprising input words identified by said apparatus and for transmitting same to remote recipients.

10. The apparatus of claim 1 further comprising:
telex means for receiving messages comprised of input words identified by said apparatus and for transmitting said messages to remote recipients.

11. The apparatus of claim 1 further comprising:
cable means for receiving message comprised of input words identified by said apparatus and for transmitting said messages to remote recipients.

12. The apparatus of claim 1 further comprising:
FAX means for receiving message comprised of input words identified by said apparatus.

13. The apparatus of claim 1 further comprising:
message storing means for storing messages comprised of words identified by said apparatus,
wherein said apparatus compares number strings against said message storing means in order to identify subsequent occurrences of said number string.

14. A method for determining the identity of an input word of a specific language, said method comprising the steps of:
entering said input word on a DTMF push button pad where at least one push button represents more than one letter and said push button is identified by one and only one number;
forming a string of numbers corresponding to said input word from said letters entered on said DTMF push button pad;
comparing said string of numbers corresponding to said input word against DTMF numeric strings corresponding to words stored in a word guessing dictionary means to determine the identity of said input word; and,
if said input word is not found in said word guessing dictionary means then comparing said string of numbers corresponding to said input word against DTMF numeric strings corresponding to words and parts of words stored in a forward dictionary means wherein said words and parts of words are stored according to the length and frequency of use of said words and parts of words in said specific language and wherein the letters of said words and parts of words are in their natural sequence, and also comparing said string of numbers corresponding to said input word against DTMF numeric strings corresponding to reversed words stored in a reverse dictionary wherein said reversed words are formed by reversing the natural sequence of the letters of said words and said parts of words and wherein said reversed words are stored according to the length and frequency of occurrence of said reversed words in said specific language.

15. The method of claim 14 further comprising the step of:
if said input word is not identified according to the steps above, then examining said string of numbers corresponding to said input word by splitting said string of numbers corresponding to said input word into groups of n where n is an integer and equals at least 2, and comparing said groups of n with DTMF strings corresponding to snippets selected and stored according to the frequency of said snippets in said specific language.

16. The method of claim 15 in which n equals 3 and in which said string of numbers corresponding to said input word is split into at least 5 groups of 3 numbers corresponding respectively to groups including a number corresponding to the first letter of said input word, groups including a number corresponding to the second letter of the input word but excluding the number corresponding to the first letter of said input word, groups including the third letter of the input word but excluding the numbers corresponding to the first and second letters of the input word, groups including the middle letters of the input word, excluding the numbers corresponding to the first, second and third letters of the input word, and groups including the final letter of the input word.

17. The method of claim 16 further comprising the step of:
splitting said string of numbers corresponding to said input word into subgroups of 2 letters if the foregoing steps have not identified said input word and comparing said subgroups of 2 with DTMF strings corresponding to said snippets.

18. A method for determining the identity of an input word of a specific language, said method comprising the steps of:
entering said input word on a DTMF push button pad where at least one push button is identified by a number that represents more than one letter;
forming a string of numbers corresponding to said input word from said input word entered on said DTMF push button pad;
comparing said string of numbers corresponding to said input word against numerical strings corresponding to common words stored in a full word dictionary means to determine if said input word exists in said full word dictionary means;
comparing said string of numbers against numerical strings corresponding to full words and parts of words stored in a forward dictionary means wherein the letters of said full words and parts of words are stored in their natural letter sequence, and said full words and said parts of words are also stored according to the length of said full words and said parts of words and the frequency of said full words and said parts of words in said specific language; and,
reversing said string of numbers and comparing said reversed string of numbers against numerical strings corresponding to reversed words stored in a reverse dictionary means wherein said reversed words area formed by reversing the natural letter sequence of said words and said parts of words and said reversed words are stored according to the length of said reversed words and the frequency of said reversed words in said specific language;
wherein if said input word is not located in said full word dictionary means, said string of numbers corresponding to said input word is compared against said numerical strings stored in said forward dictionary means and said string of numbers corresponding to said input word is reversed and compared against said numerical strings stored in said reverse dictionary means.

19. The method of claim 18 further comprising the step of:
comparing said string of numbers against trigrams comprising numerical representations of subgroups of 3 letters each if said input word is not identified when said string of numbers is compared against the DTMF numeric strings stored in said full word dictionary means, the DTMF numeric strings stored in said forward dictionary means or the DTMF numeric strings stored in said reverse dictionary means.

20. The method of claim 19 further comprising the step of:
comparing said string of numbers against digrams comprising numerical representations of subgroups of 2 letters each if said input word is not identified after comparing said string of numbers against the DTMF numeric strings stored in said full word dictionary means, the DTMF numeric strings stored in said forward dictionary means, the DTMF numeric strings stored in said reverse dictionary means and said trigrams.

21. The method of claim 20 wherein said trigrams are stored in at least 3 record files corresponding respectively to subgroups including Trigram I, a trigram made up of a numerical string including a number corresponding to the initial letter of a word, Trigram M, a trigram made up of a numerical string including a number corresponding to the middle of a word, and Trigram F, a trigram made up of a numerical string including a number corresponding to the last letter of a word.

22. The method of claim 21 further comprising the step of:
examining the first 3 numbers of the string of numbers corresponding to said input word and comparing them against said trigrams to determine the identity of a second letter in the input word based upon knowledge of the first letter of the input word and the frequency in said specific language of the following 2 letters based upon the knowledge of the first letter.

23. The method of claim 22 further comprising the step of:
examining the first 3 numbers of the string of numbers corresponding to said input word to determine the identity of the third letter of said input word based upon knowledge of the first 2 letters of said input word and knowledge of the frequency of the third letter of said input word in said specific language based on upon the identity of the first 2 letters of said input word.

24. The method of claim 23 further comprising the step
storing each input word after it is correctly identified; and,
assembling said identified words into a complete message.

25. The method of claim 24 further comprising the step of:
transmitting said message in digital form over a packet transport network to receiver at a remote location; and,
converting said digital information into speech for auditory delivery to a recipient at a remote location.

26. The method of claim 25 wherein said words stored in said full word dictionary means include proper nouns, location names, verbs, nouns, adjectives and adverbs.

27. The method of claim 26 further comprising the steps of:
storing each said input word identified by the foregoing method steps and said string of numbers corresponding to said identified input word in an internal memory dictionary; and,
comparing subsequent number strings against said strings of numbers corresponding to said input words stored in said internal memory dictionary to determine the word identity of said number strings.

28. A method of communicating information from a sender having a telephone with DTMF buttons to a remote receiver comprising the steps of:
spelling a word letter-by-letter by utilizing the DTMF buttons on the sender'telephone;
entering a signal on one of said DTMF buttons to indicate the end of the word;
comparing each word against an electronic memory which includes a dictionary of words by determining the number of letters in said word and comparing said word against words stored in said dictionary having the same number of letters, said words also being organized according to the relative frequency for any given combination of DTMF outputs;
feeding back to the sender a guess which corresponds to the word having the highest relative frequency for a predetermined word length and for a predetermined DTMF tone combination;
repeating said comparing step if a guess is rejected and feeding back to the sender another guess at the word corresponding to the same predetermined letter length and having the next most likely relative frequency;
automatically shifting from the word guessing mode to a letter-by-letter guessing mode if the dictionary runs out of guesses for a word of a given predetermined letter length and a predetermined DTMF tone combination;
storing each word after it is correctly identified;
transmitting said word as digital data over a communication means; and,
receiving said word at said remote receiving,
wherein words are entered by the sender and received by the receiver at a remote location.

29. An access node apparatus for sending messages from a sender having a telephone with DTMF buttons connected to a conventional telephone network over a communications means to a receiver, said access node comprising:
a telephone line interface connecting said access node to the telephone network of the sender;
a word guessing dictionary means for storing words according to their relative frequencies;
a prompter means connected to said telephone line interface and to said word guessing dictionary means for accessing said word guessing dictionary means;
speaker means connected to said prompter means and to said telephone line interface for speaking words guessed from said word guessing dictionary means to the sender;

mode shift means for automatically shifting the mode of said access node from a word guessing mode to a letter-by-letter guessing mode after the sender has exhausted all possible entries in the word guessing dictionary for a word of a given letter length and for a given DTMF tone combination sequence; and, message storing means connected to said prompter means for storing words prior to transmission as digital data over said communication means.

* * * * *